(12) United States Patent
Maier et al.

(10) Patent No.: US 6,254,319 B1
(45) Date of Patent: Jul. 3, 2001

(54) FRICTION AND VERTICAL CUTTING TOOL

(76) Inventors: Andreas Maier, Stegwiesen 2, 8847, Schwendi-Hörenhausen (DE); Wilfried Eble, Unterdorfstrasse 16, 77948, Friesenheim (DE)

( * ) Notice: Subject to any disclaimer, the term of this patent is extended or adjusted under 35 U.S.C. 154(b) by 0 days.

(21) Appl. No.: 09/367,860

(22) PCT Filed: Mar. 3, 1998

(86) PCT No.: PCT/DE98/00616
§ 371 Date: Sep. 30, 1999
§ 102(e) Date: Sep. 30, 1999

(87) PCT Pub. No.: WO98/39127
PCT Pub. Date: Sep. 11, 1998

(30) Foreign Application Priority Data

Mar. 3, 1997 (DE) .............................. 197 08 601
May 20, 1998 (DE) .............................. 197 19 893

(51) Int. Cl.$^7$ .............................. B23B 27/10; B23B 29/00
(52) U.S. Cl. .............................. 408/57; 407/45; 407/47; 408/153; 408/181; 408/185; 408/197; 408/713
(58) Field of Search .............................. 407/45, 47, 49; 408/57, 59, 80, 81, 83, 153, 154, 181, 185, 197, 233, 713, 1 R

(56) References Cited

U.S. PATENT DOCUMENTS

| 1,368,459 | 2/1921 | Sheuman . |
| 1,768,131 | 6/1930 | Miller . |
| 3,973,861 | * 8/1976 | Sussmuth .............................. 408/154 |

(List continued on next page.)

FOREIGN PATENT DOCUMENTS

| 449390 | 4/1968 | (CH) . |
| 2251537 | 9/1974 | (DE) . |
| 3007322 | 9/1981 | (DE) . |
| 3232804 | 3/1984 | (DE) . |
| 3918033 | 12/1990 | (DE) . |
| 4007175 | * 9/1991 | (DE) .............................. 408/83 |
| 127387 | 7/2000 | (DE) . |
| 2330488 | 6/1977 | (FR) . |
| 2615769 | 12/1988 | (FR) . |
| 2075383 | 11/1981 | (GB) . |

OTHER PUBLICATIONS

"Polykristalliner Diamant zum Feinbearbeiten von Bohrungen in Aluminum", Werkstatt und Betrieb, vol. 118, No. 5, May 1981, pp. 253–256.

"Reiben mit Einschneiden–Werkzeug", Werkstatt und Betried, vol. 114, No. 8, Aug. 1981, pp. 543–544.

"Einmesser–Automaten–Reibahle mit Wendeplatte—DPG und AP", MAPAL, Kress.

Primary Examiner—Daniel W. Howell
(74) Attorney, Agent, or Firm—Dennison, Scheiner, Schultz & Wakeman

(57) ABSTRACT

The invention relates to a friction and sinking cutting tool comprising a base member (2) to which a cutting blade (20) is exchangeably clampingly fixed by means of a clamping screw and which is adjustable in terms of its radial position by an adjusting member (40) through the intermediary of an adjusting means (30). The adjusting means (30) is a cutting blade carrier extending into a recess in the base member, and the adjusting member (40) is a differential screw which is in threaded engagement with the adjusting means. Alternatively, the adjusting means (30) can be a cutting blade carrier extending into a recess of the base member and the adjusting member (40) can be a ball member or clamping member which has automatic shape fitting engagement with a complementary recess in the adjusting means such that a movement of the adjustment member causes a movement of the cutting blade (20) in the same direction. It is advantageous if at least one bore for coolant is provided leading to the cutting zone, with at least one branch bore (22) leading outwardly from the forward region of the coolant bore. With this construction coolant and lubricant can be supplied to the cutting zone.

42 Claims, 33 Drawing Sheets

U.S. PATENT DOCUMENTS

| | | | |
|---|---|---|---|
| 4,078,868 | * | 3/1978 | Erkfritz ................................ 408/233 |
| 4,125,342 | * | 11/1978 | Kress .................................... 408/185 |
| 4,264,246 | * | 4/1981 | Lowis et al. ........................... 408/81 |
| 4,278,372 | * | 7/1981 | Heisner ................................. 408/183 |
| 4,318,647 | * | 3/1982 | Erkfritz ................................. 408/713 |
| 4,425,063 | * | 1/1984 | Striegl .................................... 408/81 |
| 4,547,102 | * | 10/1985 | Millington et al. .................. 408/713 |
| 4,850,757 | * | 7/1989 | Stashko ................................ 408/181 |
| 4,954,024 | * | 9/1990 | Kress et al. .......................... 408/197 |
| 5,149,233 | * | 9/1992 | Kress et al. .......................... 408/233 |
| 5,328,304 | * | 7/1994 | Kress et al. ............................ 408/83 |
| 5,328,307 | * | 7/1994 | Fees et al. ............................ 408/185 |
| 5,551,812 | * | 9/1996 | Basteck ................................. 408/83 |
| 5,649,794 | * | 7/1997 | Kress et al. ............................ 408/83 |
| 5,795,111 | * | 8/1998 | Kress et al. .......................... 408/713 |
| 6,033,159 | * | 3/2000 | Kress et al. ............................ 408/83 |

\* cited by examiner

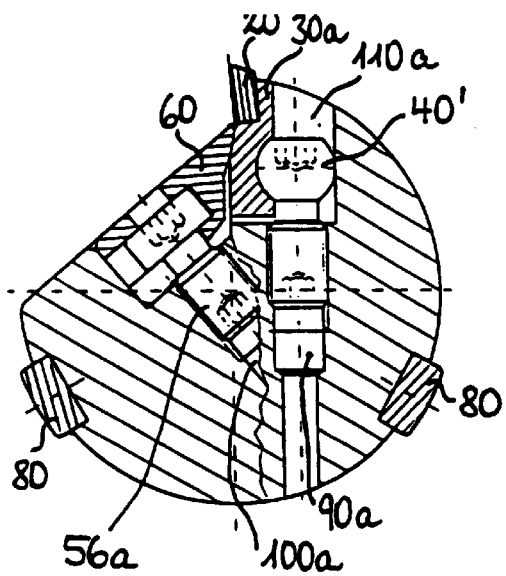
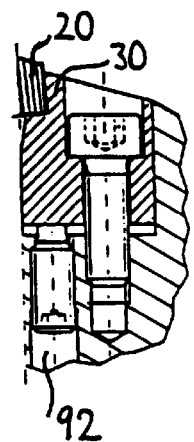
Fig. 9    Fig. 10
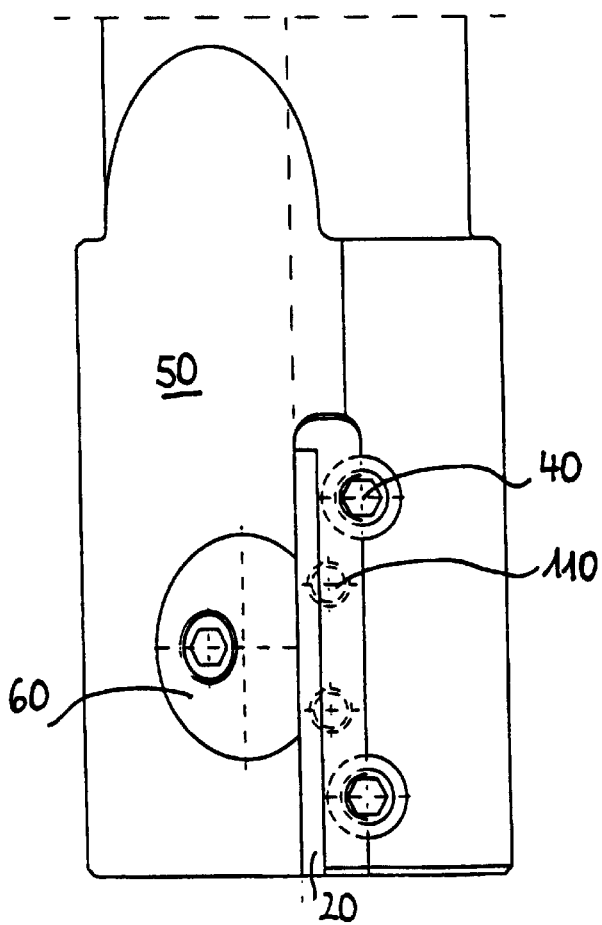
Fig. 11

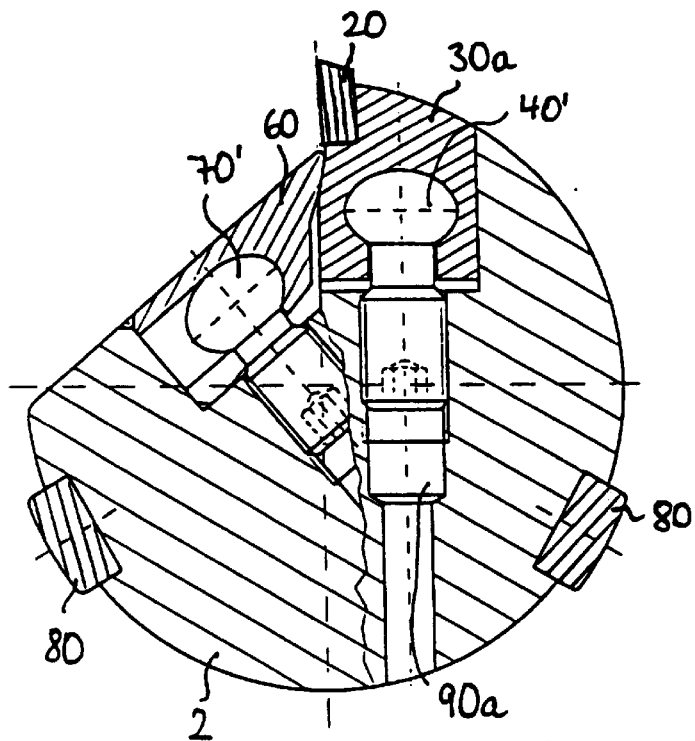
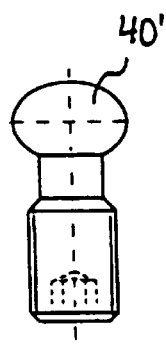
Fig. 12  Fig. 13
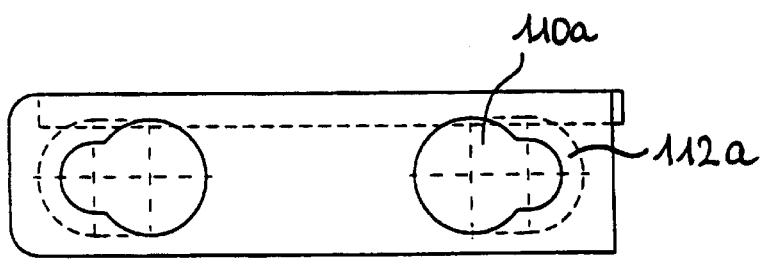
Fig. 14
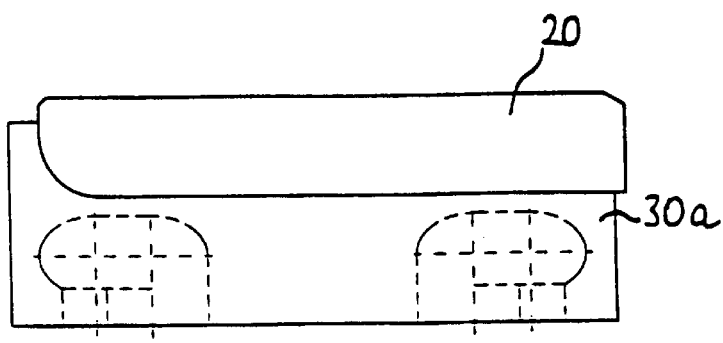
Fig. 15

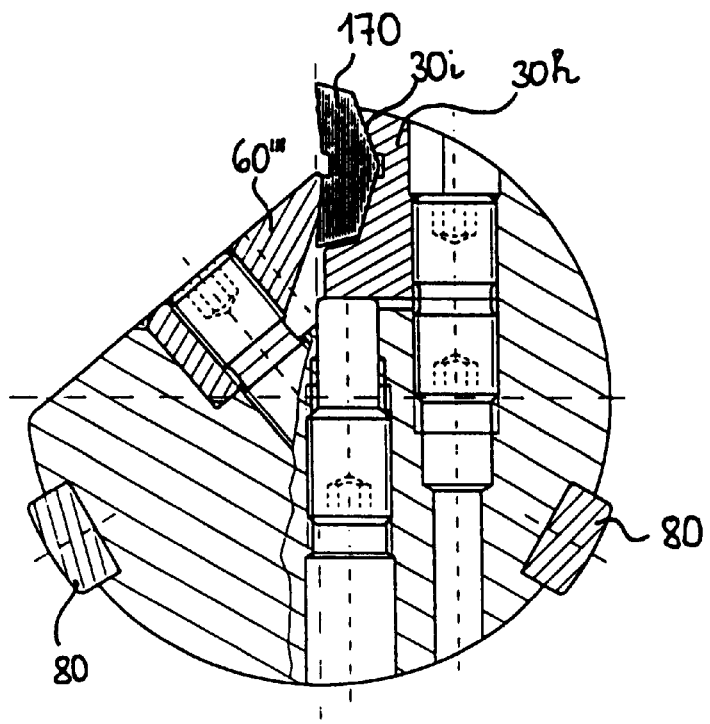
Fig. 24
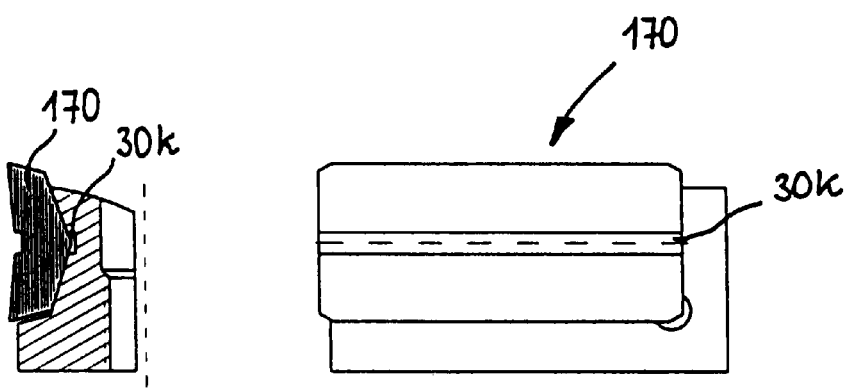
Fig. 24 a
Fig. 24 b
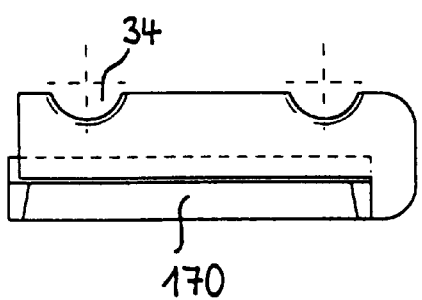
Fig. 24 c

FRICTION AND VERTICAL CUTTING TOOL

FIELD OF THE INVENTION

The invention relates to a friction and sinking cutting tool comprising a base member to which a cutting blade is exchangeably clampingly secured by means of a clamping member, with the cutting blade being adjustable in its radial position by means of an adjusting member through the intermediary of an adjusting means.

BACKGROUND OF THE INVENTION

One such tool is known from DE 32 32 804 C2. For the clamping fixing of the cutting blade there is provided a clamping wedge which is actuated for the clamping of the cutting blade carrier by means of a differential screw (double-threaded bolt). An adjusting screw with a wedge-shaped front-end member is provided in order to be able to pivot the cutting blade carrier, with the result that a radial adjustment of the cutting blade is effected. This fine adjustment of the cutting blade is comparatively time-consuming, because in order to correct an over-adjustment of the adjusting screw it is necessary to release the mechanism and to carry out the screw adjustment anew. This has to be repeated until the desired cutting diameter of the tool has been set.

From EP 0 544 658 B1 there is known a further tool of this type, in which a cutting rib is arranged on a rib-like carrier (cassette). This carrier or cassette has semi-cylindrical recesses which together form cylindrical pockets for a boring rod. In order to adjust and clamp the cassette, two adjusting screws are provided, while for the axial adjustment of the cassette an adjusting screw is provided which presses against the cassette by means of a ball. A securement of the cassette is effected by means of the adjusting screws. Here again there is the problem that the adjustment of the cutting diameter requires the expenditure of time because of repeated releasing procedures. Further, because of the mounting of the cassette on the associated longitudinal wall, a narrowing adjustment of the cutter to guarantee the cutting function is not possible.

FR 2615769A describes an adjustment device for a cutting tool in which a rounded cassette received in a bore carries the cutting blade and is adjustable by means of a screw having two threads of different characteristics. In order to make possible a transverse displacement of the cassette, a groove/rib engagement with the screw is provided. A narrowing adjustment of the cutting blade is not possible with this construction.

In a tool holder for tools for chip-producing working according to DE 30 07 322A the cutting tool comprises a cutting blade which is exchangeably clampingly fixed by a clamping member and which is adjustable as to its radial position by an adjusting member by way of a cutting blade carrier serving as adjusting means. In order to adjust the cutting diameter repeated releasing procedures are necessary. A further adjusting member for the axial adjustment of the cutting blade carrier has its head in automatic shape-fitting engagement in a complementary recess thereof such that the cutting blade carrier can be retracted or alternatively advanced in the axial direction by the latter adjusting member.

From CH-PS 449 390 there is known a reamer with coolant supply, whose tool body is provided with a central longitudinal bore leading to the cutting head, from which longitudinal bore a plurality of cross-bores extend outwardly at an angle between the blades. By means of these bores, coolant and lubricant are supplied in order to cool and lubricate the cutting head during the cutting process.

In a reamer with adjustable cutting head described in DE 32 34 238 A, a central coolant bore is provided which branches into two diverging branch bores which extend forwards at a shallow angle to the shaft of the conical screw.

According to EP 0 215 144 B there is provided a reamer with cutting head expandable by a conical screw, with the cutting head having a coolant channel extending axially through the reamer shaft, the coolant channel running into a threaded bore receiving the threaded shaft of the conical screw and subsequently to this communicating with a hollow cylindrical portion of the reamer shaft expandable by the conical screw. Between the hollow cylindrical shaft portion and the conical screw there is an annular channel which is connected to the axial coolant channel by means of an axially parallel coolant channel in the conical screw. From the annular channel there extends at least one channel between the cutters, with this channel being directed forwards at an angle between 30° and Automatic reamers are also known in which the coolant is guided through the shaft directly to the cutters.

SUMMARY OF THE INVENTION

It is the object of the invention to provide a friction and sinking cutting tool which comprises a cutting blade which is adjustable steplessly inwards and outwards in terms of its radial position. The cutting tool should desirably be provided also with means to supply coolant and/or lubricant to the cutting region.

This object is achieved in accordance with the invention by a friction and sinking cutting tool having the features described in greater detail hereinafter claim 1 or 2. Preferred features of the friction and sinking cutting tool of the invention are set out in the subsidiary claims.

A friction and sinking cutting tool according to the invention thus comprises a base member to which a cutting blade is exchangeably clampingly secured by means of a clamping member, and with the blade being adjustable in terms of its radial position by means of an adjusting member through the intermediary of an adjusting means. According to a first variant, the adjusting means is a cutting blade carrier extending into a recess of the base member and the adjusting member is a differential screw which is in threaded engagement with the adjusting means. According to a second variant, the adjusting means is a cutting blade carrier extending into a recess of the base member and the adjusting member is a ball member of clamping member which is in shape-fitting engagement with a complementary recess in the adjusting means such that a movement of the adjusting member brings about a movement of the cutting blade in the same direction.

By the design of the adjusting member according to the invention one achieves advantageously a stepwise movement of the cutting blade in both directions. This adjustment is effected without play and is possible over a defined diameter range. Thus, if the cutting diameter of the tool must be changed, this can be effected simply by adjustment of the differential screw in the desired direction, and it is in no case necessary to release the mechanism for a further adjustment process.

A further advantage of the design of the adjusting member as a differential screw is that it makes possible a space-saving design, because in contrast to conventional adjustment screws no through bore in the base member of the tool is any longer necessary. On the contrary, an adjustment of the differential screw can be effected from the cutting side. This offers more space for the cutting and for other parts of the tool. On the other hand, the arrangement is also compact, because only space for the cutting plate and for the adjusting means is required. The greater space which is available makes possible more fittings. For example, several cutters can be used. In terms of the smallest desirable tool diameter it appears at present that this is a tool of 10 mm diameter, equipped with an adjustment stroke of ±1 to 2 mm.

Preferably, in the customary way for the clamping fixing of the cutting blade, a clamping wedge is provided which is secured by means of the clamping member on the cutting blade side of the cutting blade carrier. For the clamping member one can use a normal clamping screw, or alternatively a differential screw.

Preferably, the adjusting member is provided with half threads. This save space and in particular makes it possible for the adjusting screw to perform only an adjustment function and no power generation etc.

Depending upon requirements, the adjusting member can have a different thread pitch in the two oppositely running threads, which permits a very delicate adjustment depending upon the pitch pairing.

The cutting blade carrier can be a cassette extending in the longitudinal direction of the cutting blade, with the cassette being of block form and having a recess for the cutting blade. The cassette can for example be made of steel and the cutting blade for example can be of hard metal or cermet and this blade can be connected to the cassette by means of a soldered connection or by shape fitting.

Suitable materials for the cutting blade are hard metal, cermet, ceramic, polycrystalline, natural and synthetic diamond as thin-film and thick-film. The cutting blade carrier can be made of hard metal as an alternative to steel. The cassette can be open with threaded sections and complementary recess for an engagement with the adjusting member on its side remote from the cutting blade. In this arrangement the cassette is very space-saving and particularly suitable for small tool diameters. Since the adjusting member serves only for the purposes of adjustment, threaded sections for the engagement can be used which pose no problems. The same applies for the complementary recess in the embodiment which has automatic fitting by shape. This enables the object to be achieved with an open design.

On the other hand, a closed cassette design can likewise be advantageous. In this case, the thread is formed on the inside of the cassette and the complementary recess correspondingly, and this results in a larger contact and engagement surface.

In order to fix the cassette in place with larger tool diameters, the cassette is preferably provided with bores for support screws. Alternatively or additionally, the base member can be provided with a bore for a support screw for the securement of the clamping wedge.

In a further preferred embodiment of the tool of the present invention, a groove is provided in the cassette and/or in the clamping wedge as a complementary recess for the adjusting member and/or clamping member respectively. This groove extends in the longitudinal direction of the cassette. Through the shape of the groove or grooves one can achieve a matching to the shape of the head of the adjusting member or of the clamping member respectively, in order to achieve the desired shape fitting. As shapes, one can use for example a ball, ellipse, rectangle, trapezium and many more. It is only necessary that one ensures a reliable actuating engagement.

In order to bias the cassette and/or the clamping wedge outwardly, springs are preferably provided.

In a preferred embodiment of the tool according to the invention, a securing pin fixed in the base member and extending in the radial direction is in engagement with the end of the cassette which is to the rear in relation to the tip of the tool. It is the object of this securing pin to secure the cassette against the effect of axial forces and thus against displacement.

Furthermore, a recess can be provided in the base member for engagement with the end of the cassette which is to the rear in relation to the tip of the tool, with this recess having a shape which corresponds in its contour to the shape of the end of the cassette. By means of this shape fitting one has a contour contact between cassette and base member which makes possible a reliable and stable take-up of the axial cutting forces.

The tool according to the invention can be provided with one or more guide ribs. In the usual way these offer a stable running of the tool. With very short tools these guide ribs may not be necessary. The guide ribs can be of hard metal, cermet, ceramic, polycrystalline, natural and synthetic diamond and other hard materials. They can be formed without lamination, as a simple layer and also as multiple layers. Preferably, at least one guide rib is provided per cutter. In one embodiment of sinking and friction cutting tool, two guide ribs are provided per cutter.

The guide ribs are preferably provided between the cutters on the periphery. However, one can also provide a guide rib which is arranged axially offset in relation to the associated cutter. In this way, the number of guide ribs per cutter and the desired guiding effect can be maintained in spite of larger numbers of cutters, and thus a quiet, stable running of the tool can be ensured despite high speeds of rotation and/or workpieces of greater hardness.

In one arrangement using two guide ribs, these can be provided at a circumferential angular spacing of 120° relative to one another and in relation to the cutting blade.

The space-saving arrangement of the cutting blade and of its adjusting mechanism in accordance with the invention makes it possible in a simple manner to use one cutting blade or several cutting blades which are axially spaced (stepped tool). Likewise, two or more cutting blades can be arranged around the periphery. In order that at least one cutter is adjustable, a pre-cutting step can be provided. A desirable embodiment has two diametrically opposed cutting blades. Besides one or more cutters provided at the periphery, an end cutter or an end cutting region can be provided.

Instead of using a cassette as a cutting blade carrier one can alternatively use a plate with adjusting mechanism and differential screw.

In the case where the adjusting member is not a differential screw but for example is a ball member or clamping member, this is desirably fitted to a rod member and has a contour which is matched to a corresponding recess in the cutting blade carrier in order to ensure automatic engagement.

Preferably, internal cooling is provided. In the case of blind bores these can be arranged at the front end, while in the case of through bores they are preferably designed with diversions transversely to the through bore.

With the friction and sinking cutting tool according to the invention, preferably a central axial coolant bore is provided in the tool shaft and at least one bore for coolant and/or lubricant leading to the cutting region, and at least one branch bore extends outwardly from the axial coolant bore in its forward region. Preferably, the branch bore issues into a coaxial feed bore which extends axially at least partially over the cutting region, and at least one outlet bore to the cutting region leads from the coaxial feed bore.

With this construction of the friction and sinking cutting tool, coolant and lubricant can be supplied to the cutting region even if a plurality of cutters are provided. The bore carrying the coolant and lubricant does not run through the central region of the base member in the forward or cutting region, so that at this point there is no weakening of the material. On the contrary, the bore in the cutting region extends coaxially and in the radial direction close to the cutters and guide ribs which are to be cooled or lubricated. By means of the simple channel design the bore geometry is very simple and therefore can be effected at low cost for the most varied types of friction, sinking and boring tools. In addition to this, the cooling effect of the coaxial bore carrying the coolant through the tool shaft can be utilised.

An emulsion containing 10% and more of oil is particularly suitable for use as coolant and lubricant in the friction and sinking cutting tool of the present invention.

In particular, the bore design of the present invention makes it possible to cool and lubricate the guide ribs of such a tool, so that a smoother and damage-free running of the tool is guaranteed. Desirably, each guide rib has an outlet bore associated therewith. The coolant and lubricant can be supplied very precisely and the intermediate spaces between the guide ribs can be well cleaned of any remaining chip material, etc.

Preferably, the coaxial feed bore extends over the whole length of the cutting region. In this way, the coolant and lubricant can be distributed over the whole cutting region and can be supplied to the cutters or guide ribs at desired positions through the outlet bores. A particularly good cooling and lubricating effect is achieved in the friction and sinking cutting tool of the present invention if a plurality of axially offset outlet bores are provided. The number and axial arrangement of the outlet bores can be chosen in accordance with the expected mechanical and thermal loads in the cutting region.

Preferably, the outlet bore issues into the chip space of an associated cutter. In this way the coolant and lubricant goes directly to the the cutter to be cooled and the chip material can be freed and carried away.

In one advantageous embodiment of the friction and sinking cutting tool of the present invention the outlet bores associated with the guide ribs lead outwards in advance of the guide ribs in the direction of rotation, i.e. the coolant and lubricant goes directly to the associated guide ribs.

Preferably, the branch bore is directed forwards at an angle. The stream of coolant and lubricant can thus be directed particularly simply to the cutting tip.

In one embodiment of the friction and cutting tool of the present invention the branch and/or outlet bores associated with the guide ribs have a smaller diameter than the bore associated with the cutter. In this way, the cutter which is subject to much more severe mechanical stress is supplied with more coolant than the guide ribs.

Advantageously, in order to increase the effect of the coolant and lubricant, at least one clearance channel can be provided in the outer periphery of the base member and into which at least one of the outlet bores issues.

For additional cooling of the guide ribs, these can have at least one outlet bore extending outwards therethrough.

The tool of the present invention is suitable for friction and sinking systems and can be utilised also for end-face cutting tools.

The invention is described in more detail hereinafter in relation to embodiments given by way of example and with reference to the drawings. These illustrations serve only to give an understanding of the invention and should not be taken to limit the invention either individually or in the combinations of features in the subsidiary claims.

BRIEF DESCRIPTION OF THE DRAWINGS

FIG. 4a is a partially broken away schematic sectional view through a variation of the friction and cutting tool illustrated in FIG. 4, having two diametrically arranged cutting blades, two guide ribs and offset clamping wedges, FIG. 9 is a partially broken away sectional view through a fifth embodiment of friction and cutting tool according to the invention, similar to FIG. 1, FIG. 10 is a partial view of a cassette according to a sixth embodiment, FIG. 11 is a view similar to FIG. 5, in which the cassette has additional bores for supporting screws, FIG. 12 is a partially broken away sectional view through a seventh embodiment of friction and cutting tool according to the invention, similar to FIG. 1, FIG. 13 is a view of an adjusting member formed as a ball member, FIG. 14 shows one embodiment of a cassette and clamping wedge according to the subject invention;

FIG. 15 shows a second embodiment of a cassette and clamping wedge according to the present invention;

FIG. 18a is a partially broken away sectional view through a variation of the friction and cutting tool of FIG. 18, with shape-fitting engagement of the adjusting member, FIG. 19a is a plan view of the clamping wedge of FIG. 18a, FIG. 20 is a partially broken away sectional view through a ninth embodiment of friction and cutting tool according to the invention, similar to FIG. 1, FIG. 21a is a partially broken away sectional view through a variation of the friction and cutting tool of FIG. 21 with alternative shape-fitting engagement of adjusting means and adjusting member, FIG. 21b is a partially broken away sectional view through a further variation of the friction and cutting tool of FIG. 21, with alternative shape-fitting engagement of adjusting means and adjusting member, FIG. 22a shows a cutting blade having a first shape for use with the cutting tool shown in FIG. 22;

FIG. 22b shows a cutting blade having a second shape for use with the cutting tool shown in FIG. 22;

FIG. 22c shows a cutting blade having a third shape for use with the cutting tool shown in FIG. 22;

FIG. 22d shows a cutting blade having a third shape for use with the cutting tool shown in FIG. 22;

FIG. 23a is a partially broken away sectional view of the friction and cutting tool of FIG. 23, FIG. 24 is a partially broken away sectional view of a thirteenth embodiment of friction and cutting tool according to the invention, similar to FIG. 1, in which the cassette has a shape-fitting clamping connection with the cutting blade, FIG. 24a is a first detail view of a portion of the tool shown in FIG. 24;

FIG. 24b is a second detail view of a portion of the tool shown in FIG. 24;

FIG. 24c is a third detail view of a portion of the tool shown in FIG. 24;

FIG. 25a is a sectional view of the friction and cutting tool of FIG. 25, FIG. 25b shows a cutting blade having a first shape for use with the tool of FIG. 25;

FIG. 25c shows a cutting blade having a second shape for use with the tool of FIG. 25;

FIG. 25d shows a cutting blade having a third shape for use with the tool of FIG. 25;

FIG. 25e shows a cutting blade having a fourth shape for use with the tool of FIG. 25;

FIG. 26a is a sectional view through the friction and cutting tool of FIG. 26, FIG. 26b is a side view of a variation of the friction and cutting tool shown in FIG. 26 and FIG. 26a, having a different shape of cutting blade, FIG. 26c is a sectional view through the friction and cutting tool of FIG. 26b, FIG. 27a is a sectional view through the friction and cutting tool of FIG. 27.

DETAILED DESCRIPTION OF THE INVENTION

Figure 1:
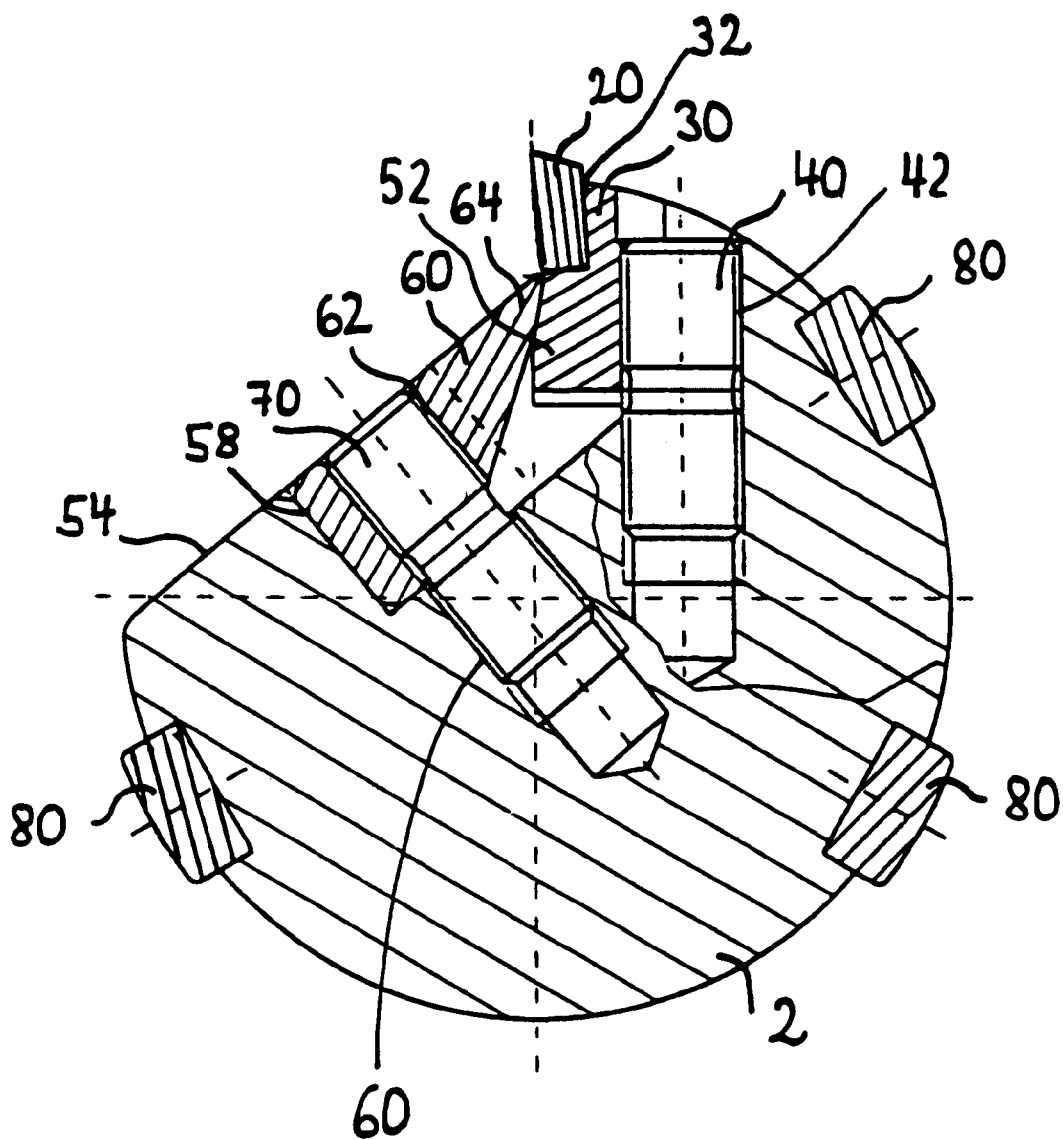
FIG. 1 is a partially broken away sectional view through a first embodiment of friction and cutting tool according to the invention having three guide ribs, the section being taken along the line B—B in FIG. 5.

In the drawings the same reference numerals are always used for the same respective parts in the different views.

Reference is first made to FIG. 1, which shows the basic structure of the cutting tool according to the invention in the region of the clamp fixing and adjustment mechanism for the cutting blade. The illustrated tool is a friction tool (reamer). However, the invention is not limited to this.

Figure 5:
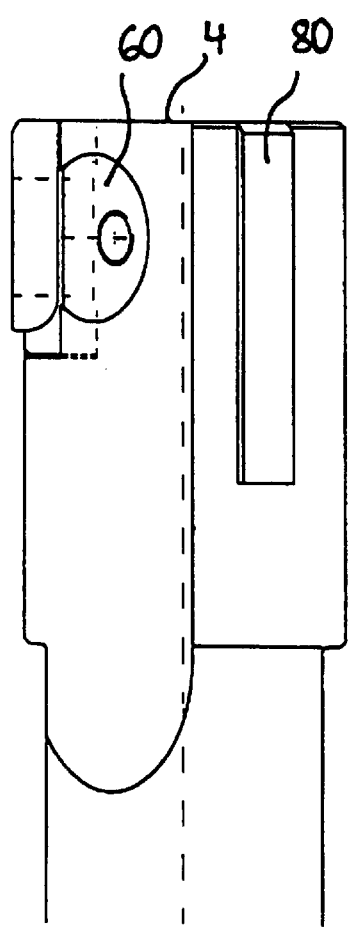
FIG. 5 is a plan view of the tool which shows the cutting blade, cassette, adjusting member and clamp fixing.
Figure 5A:
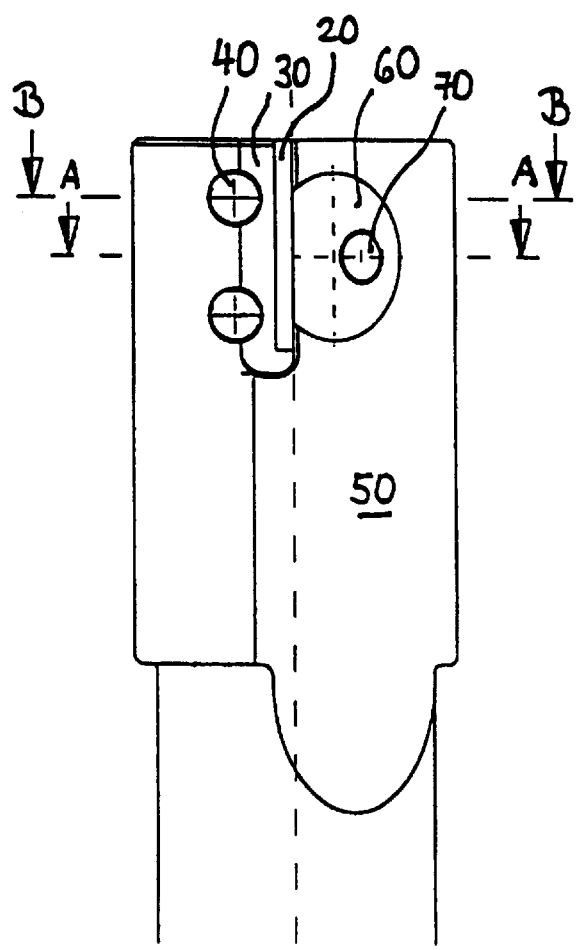
FIG. 5a is a view similar to FIG. 5, in which the tool has been rotated through 90° to the right.

The tool has a cylindrical base member 2, which in the present embodiment includes a flat end face 4 (see FIG. 5). The base member 2 has three guide ribs 80 around the circumference. At the forward end the base member 2 supports a peripheral cutting blade 20 of hard metal which is fixed by soldering in a recess 32 of a steel cassette 30 which forms the cutting blade carrier. The cutting blade 20 is adjustable in terms of its radial position by an adjustment mechanism which will be described hereinafter, and is held by a clamp fixing, also to be described hereinafter, such that it is exchangeable.

Figure 6:
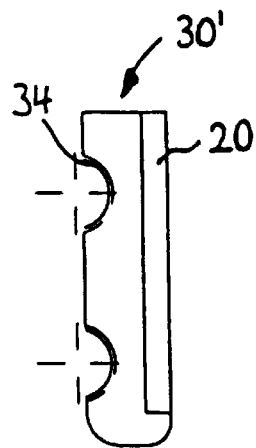
FIG. 6 is a view of the cutter cassette in open type of construction.

The cassette 30 (see FIG. 6) is consequently a strip-like solid body extending in the longitudinal direction at least over the length of the cutting blade 20. On the side remote from the cutting blade 20 the cassette 30 has two open threaded sections 34, which are respectively in engagement with an adjusting member (here a differential screw 40) with threads of contrary sense. By means of this threaded engagement the cassette is adjustable and consequently the cutting blade 20 is adjustable inwards and outwards in the radial direction, so that the cassette is simultaneously a cutting blade carrier and adjustment means. The differential screw 40 makes it possible to adjust the cassette in a stepless manner free from play within a defined diameter range, for example for a drill diameter of 10 mm±1 to 2 mm. Since the differential screw only has an adjustment function, the space-saving construction with half threads is possible.

The cutting blade arrangement is located at the boundary of a hollowed-out chip space 50 which extends through a circumferential angle of 130°. A groove 52 for the cassette is recessed into the base member 2. The bore 42 for the differential screw 40 merges with the groove 52.

The clamp fixing of the cutting blade arrangement will now be described. In direct engagement with the cassette 30 is a clamping wedge 60 which lies flush with the boundary wall 54 of the chip space 50. The clamping wedge 60 has a threaded bore 62 which is aligned with a radially inwardly extending threaded bore 56 in the base member 2 in the assembled state. For the clamp fixing engagement there is provided a clamping screw 70, which may likewise be a differential screw. In the clamping engagement, the clamping wedge 60 is located snugly in engagement with the wall 58 of the base member and with the tapering end region 64 in clamping engagement with the cassette 30.

At its periphery the base member 2 carries three guide ribs 80 of hard metal. The guide ribs serve to sustain quiet running of the tool by their centering action.

Figure 1A:
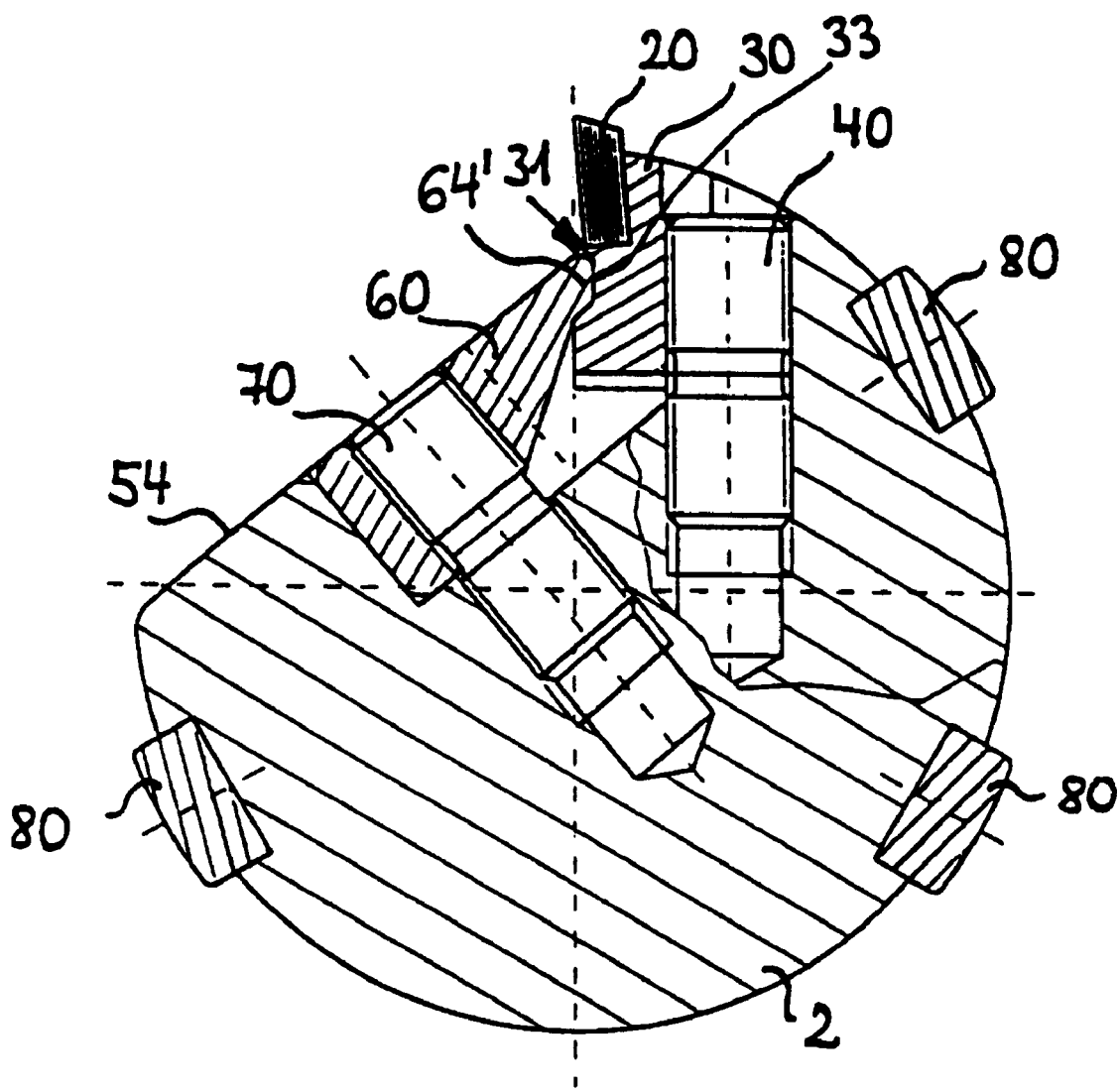
FIG. 1a is a partially broken away sectional view through a variation of the friction and cutting tool shown in FIG. 1, with a different clamping engagement zone between clamping wedge and cutter cassette, likewise taken along line B—B in FIG. 5.

A variation of the cutting tool of FIG. 1, illustrated in FIG. 1a, differs only in the design of the wedge-shaped end region of the clamping wedge 60. The end region 64 illustrated here is a projection with contact surfaces which are located in engagement in a receiving channel 33 of the cassette 30. For the rest, this tool requires no further description and reference can be made to the description above.

Figure 2:
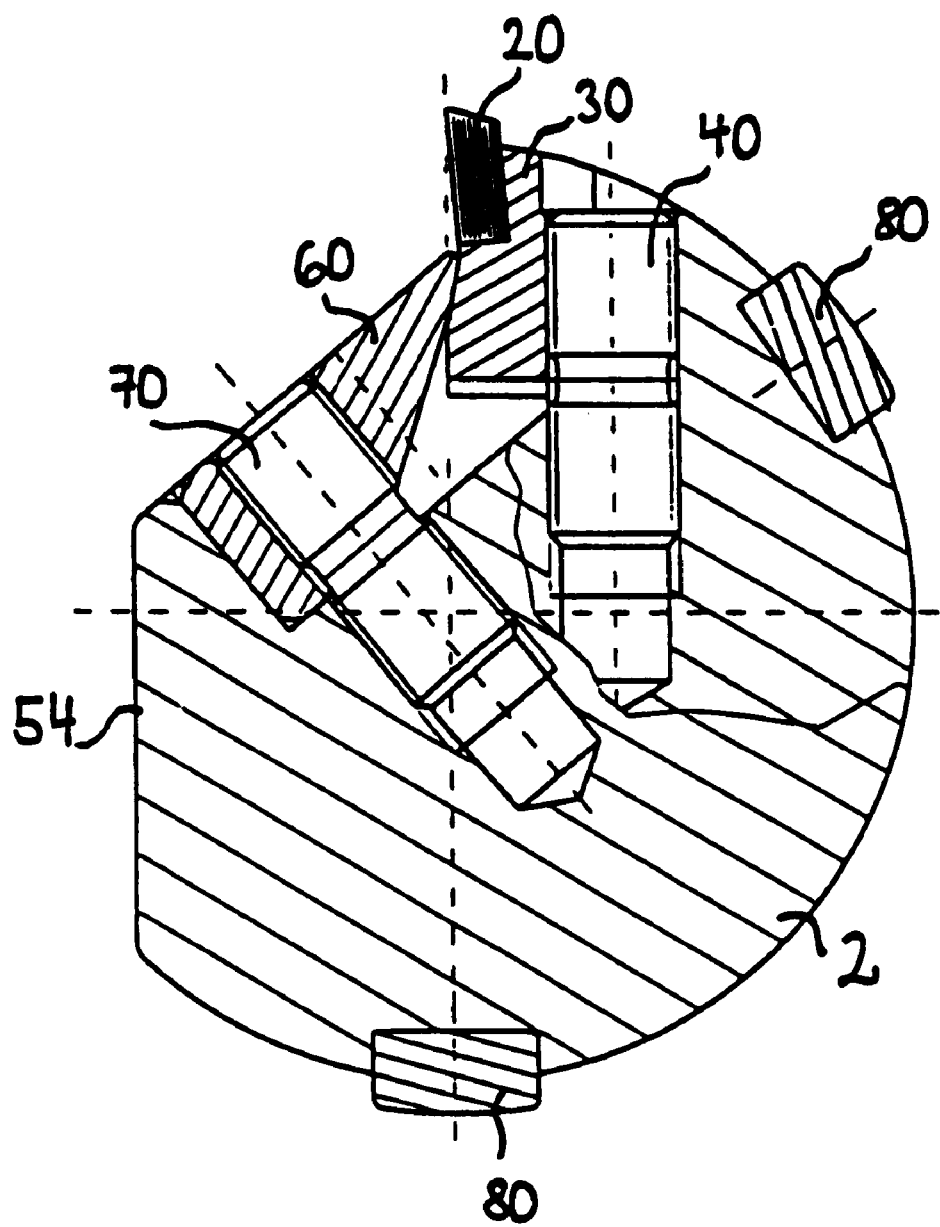
FIG. 2 is a partially broken away sectional view through a second embodiment of friction and cutting tool according to the invention, having two guide ribs, and taken along line B—B in FIG. 5.

FIG. 2 shows a second embodiment of a reamer according to the invention having two guide ribs 80. The lower guide rib 80 in FIG. 2 lies opposite the cutting blade 20.

Figure 3:
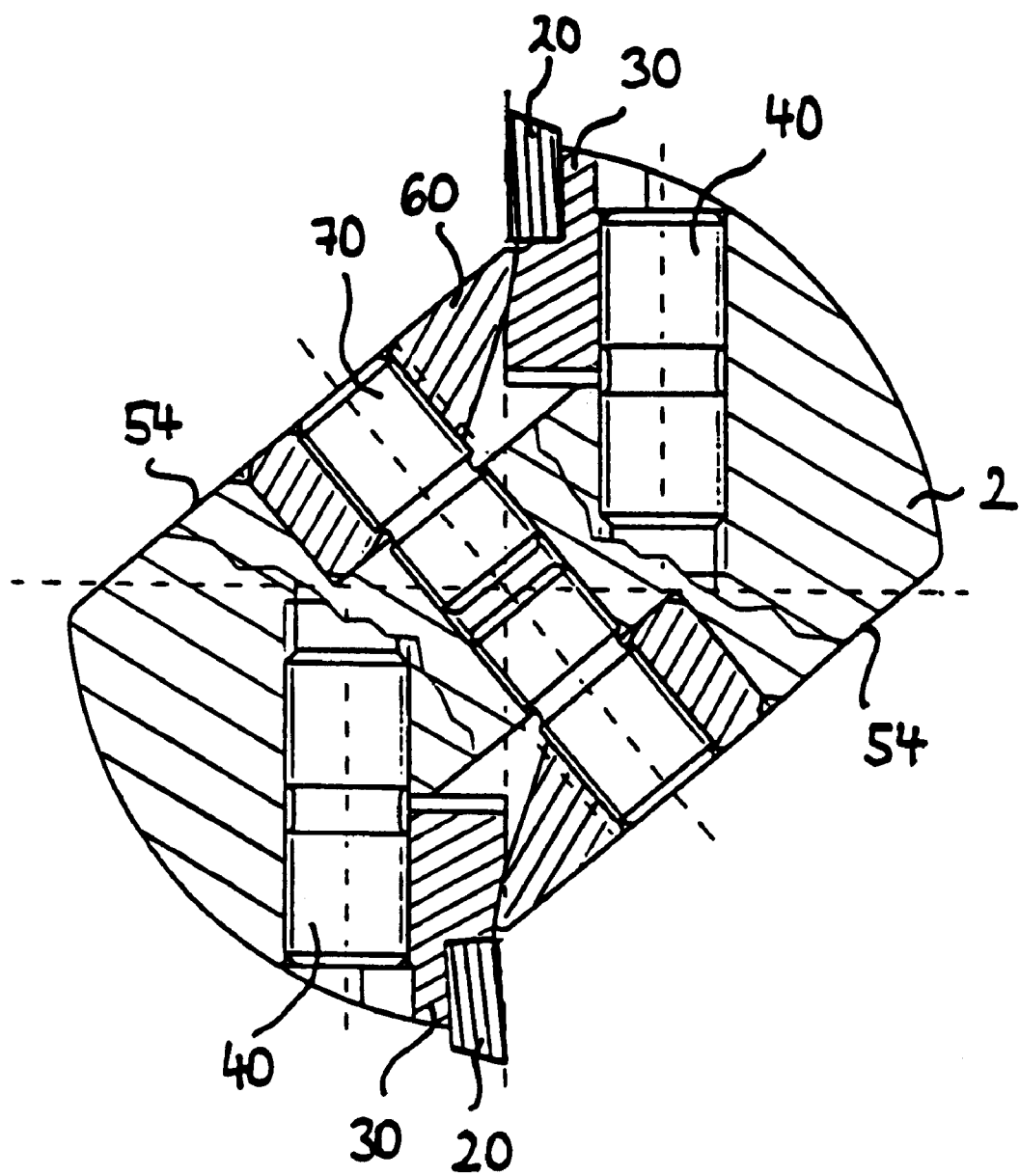
FIG. 3 is a partially broken away schematic sectional view through a third embodiment of friction and cutting tool in accordance with the invention, having no guide ribs, but having two diametrically opposed cutting blades and oppositely disposed clamping wedges.

A third embodiment of reamer according to the invention, shown in FIG. 3, comprises two oppositely disposed cutting blades 20. The clamping wedges 60 are arranged opposite one another and are secured by means of aligned clamping screws 70. The reamer has no guide ribs. This arrangement is suitable in particular for small diameter work.

Figure 4:
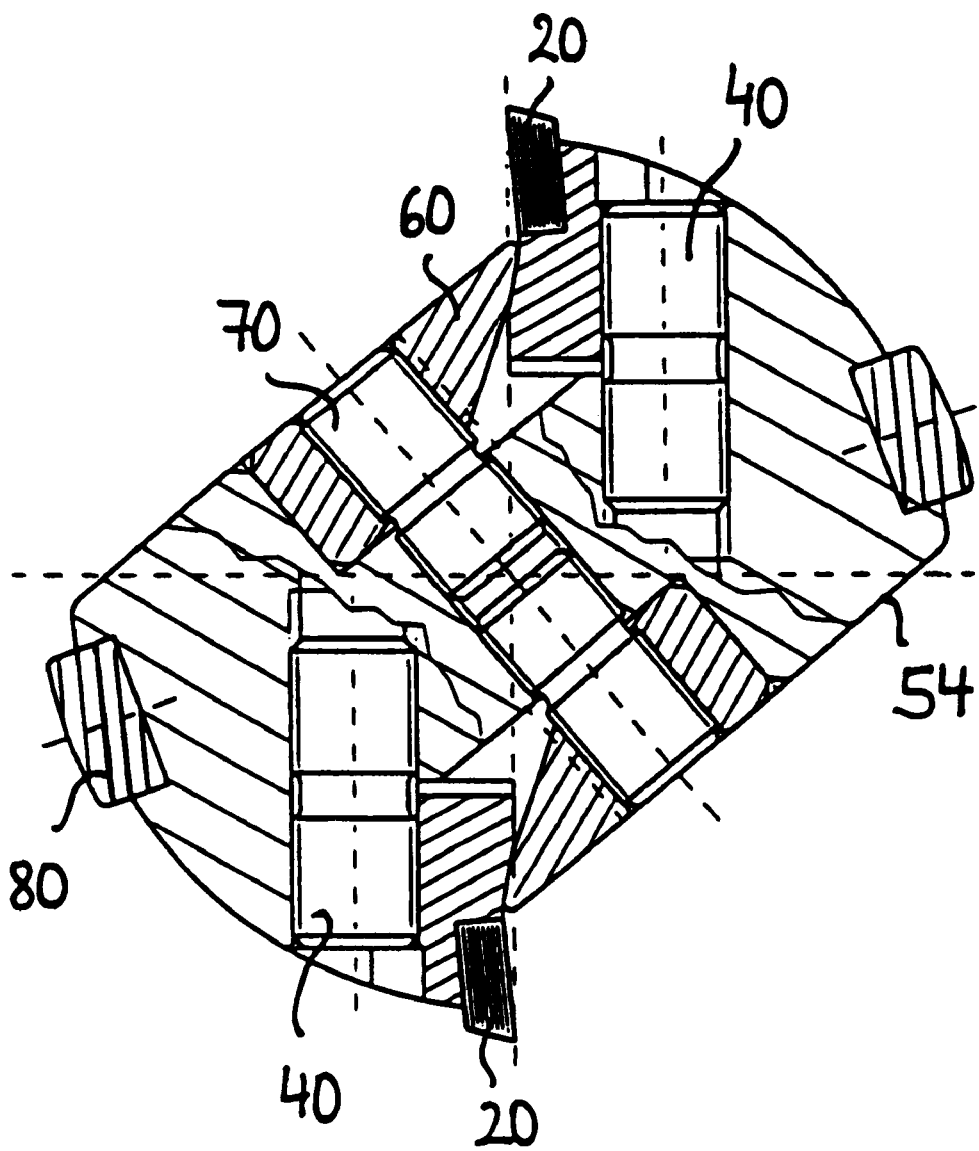
FIG. 4 is a partially broken away schematic sectional view through a fourth embodiment of friction and cutting tool according to the invention, having two diametrically opposed cutting blades, two guide ribs and opposed clamping wedges.
Figure 4:
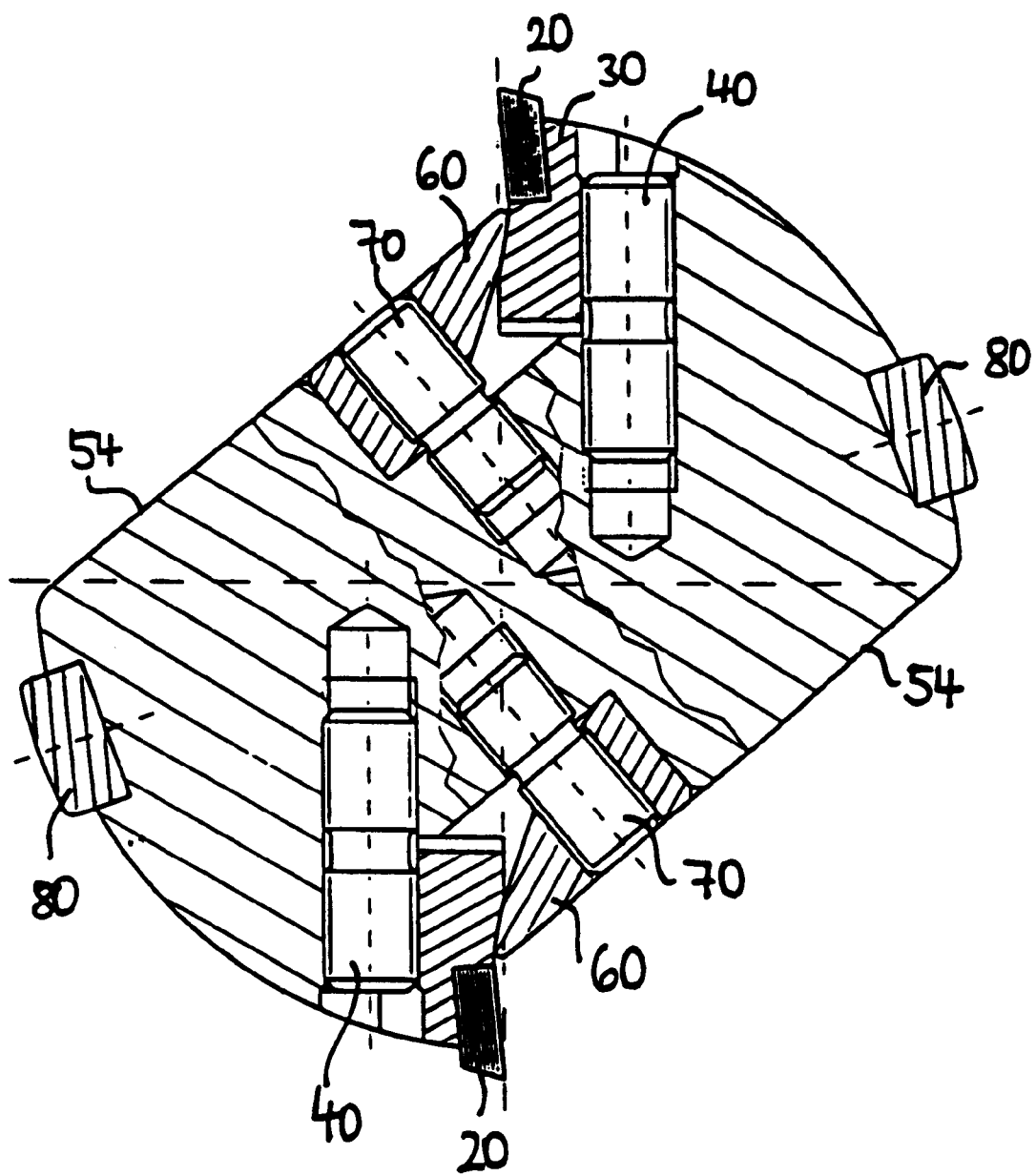

The reamer according to a fourth embodiment of the invention, illustrated in FIG. 4, differs from the preceding embodiment in that here there are two guide ribs 80 arranged opposite one another.

FIG. 4a shows a variation of the reamer of FIG. 4, in which the clamping wedges 60 with their clamping screws 70 are arranged offset in relation to one another.

Figure 7:
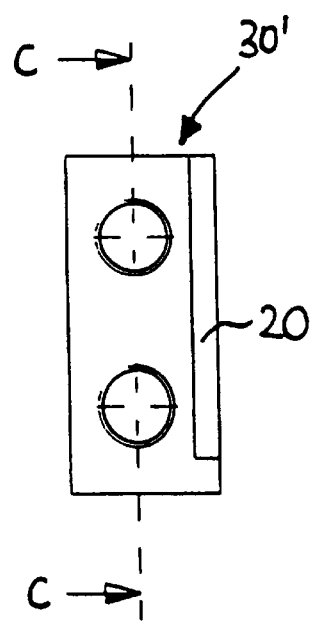
FIG. 7 is a plan view of a closed design of cassette.
Figure 8:
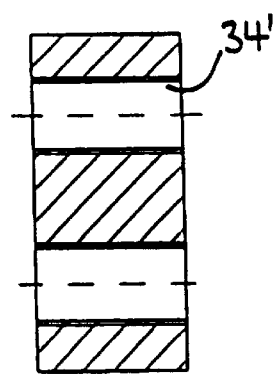
FIG. 8 is a sectional view taken along the line C—C in FIG. 7.

FIGS. 7 and 8 show an alternative embodiment of a cassette 30', which is of closed design and comprises two full threads 34' extending through its body. This embodiment is more voluminous than the open structure, but it does however offer the advantage of an increased stability and greater contact surface area.

FIG. 9 shows a fifth embodiment of a tool similar to the first embodiment described in relation to FIG. 1, but however of larger diameter. This tool comprises a closed cassette 30a carrying the cutting blade 20, which cassette is correspondingly wider and has on the outside a bore 110a for a support screw which is in engagement with an adjusting member formed here as ball member 40'. Such an adjusting member or ball member 40' is illustrated separately in FIG. 13. On the inner side of the tool the cassette 30a has a further bore 90a in alignment with the bore 110a for receiving a support screw which likewise serves for the purpose of stabilisation. The bore 90a is accessible from the opposite side of the base member 2. Also, the bore 56a in the base member 2 is lengthened by an aligned additional bore 100a which likewise is provided to receive a support screw. The lock screws or set screws provided as support screws serve only for the purpose of fixing, not for the adjustment itself, and they are used with larger diameter tools in which larger cutting forces occur, which are imposed on the cassette by way of the cutting blades and the retaining parts.

In the variation illustrated in FIG. 10, in comparison to the embodiment shown in FIG. 9, the bores for the adjusting member 40 and the associated support screw are not in alignment. On the contrary, the bore 92 for the support screw is arranged offset inwards in the direction of the cutting blade in relation to the differential screw bore 110a. Thus, support screws can be fitted from the outside, as shown by the bores 110 illustrated in FIG. 11.

FIG. 12 shows a seventh embodiment, in which the clamping screw and also the adjusting member in the form of a ball member (shaped part) are designed in an alternative manner. Instead of a ball member one could, as also in the other cases, use for example an ellipsoidal part.

Figure 16:
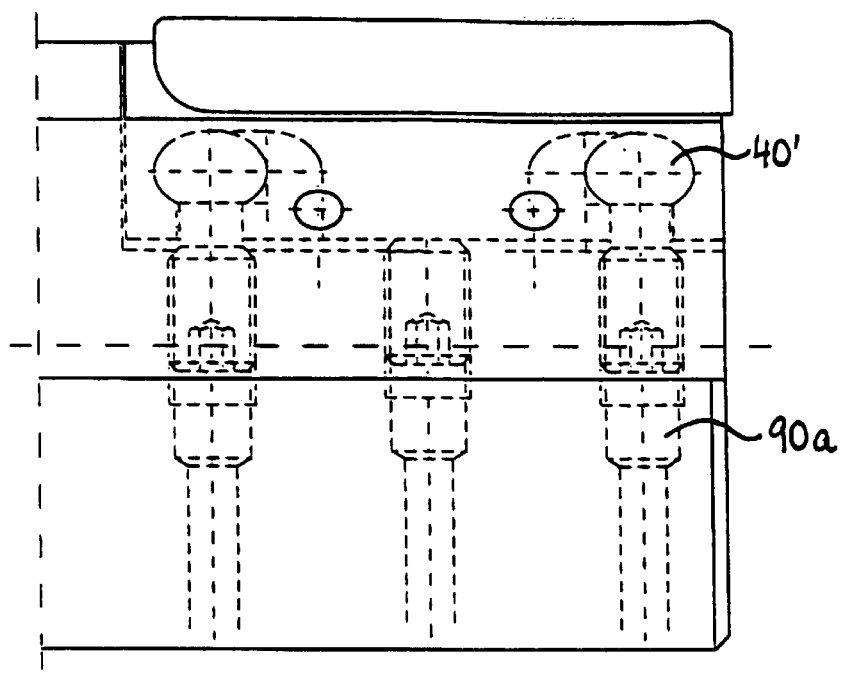
FIG. 16 shows a third embodiment of a cassette and clamping wedge according to the present invention.
Figure 17:
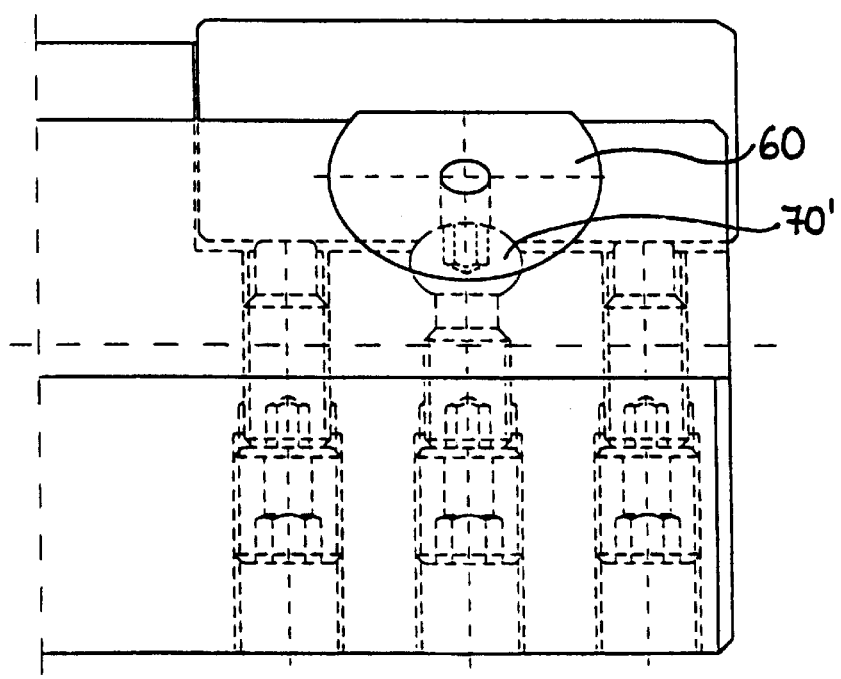
FIG. 17 shows a fourth embodiment of a cassette and clamping wedge according to the present invention.

FIGS. 14 to 17 illustrate the arrangement of the adjusting member 40' in the cassette 30a as a ball member. In particular, these Figures show an entry hole and a complementarily shaped recess 112a, in which the adjusting members 40' are respectively arranged, as can be seen best from FIG. 14. FIG. 15 shows the positional relationship between the entry hole and the complementary recess, for example as seen at the right-hand side of FIG. 9, and FIG. 16 shows the arrangement in the assembled state. FIG. 17 shows this correspondingly for the clamping member 70' formed as a ball member.

In the eighth embodiment and a variation thereof illustrated in FIGS. 18, 18a, 19 and 19a, further examples are shown of a shaped recess for the adjusting member and clamping member, in which these have a flat head shape. In both cases, in the cassette 30" and in the clamping wedge 60" there is provided a respective through-going groove 112b and 120, which have been laterally milled or possibly formed by erosion. In the illustrated embodiments the shape of the grooves is channel-shaped or trough-shaped. These variations are particularly suitable for flat cutter plates. In these embodiments, to help assembly, an engagement hole 70b can be provided for the use of a fitting key from the outside of the tool.

Figure 20:
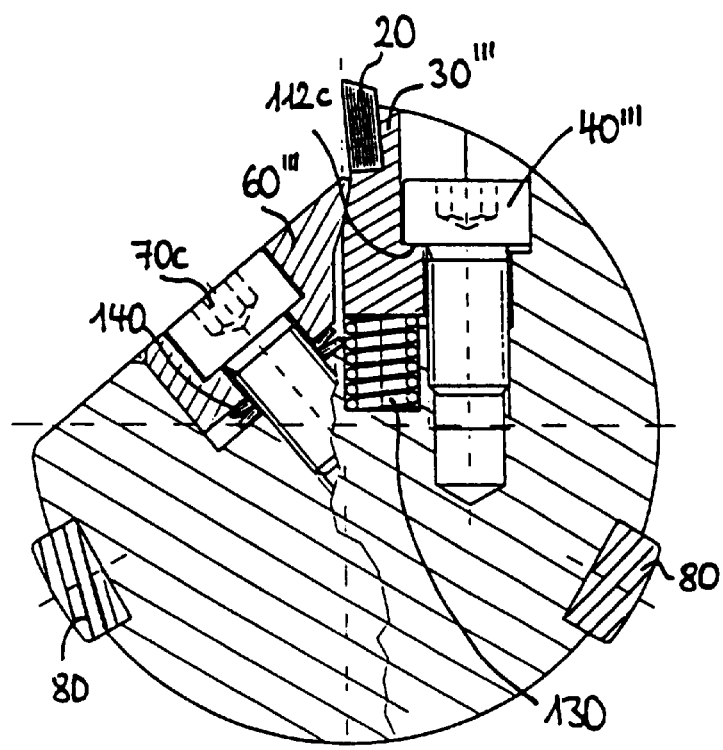

In order to compensate for different structural depths and in order to prevent undesirable play, in the ninth embodiment of the invention shown in FIGS. 20 it is advantageous if a spring 130 is provided which presses from below against the cassette 30''' and is seated against a shoulder 112c under the head of the screw 40'''.

Moreover, in FIG. 20 there is shown a cup spring 140 which presses from below against the clamping wedge 60'''. If the clamping wedge 60''' has been loosened by means of an assembly key fitted in the head recess 70c of the clamping screw 70''', the cup spring 140 biases the clamping wedge 60''' outwards.

Figure 18:
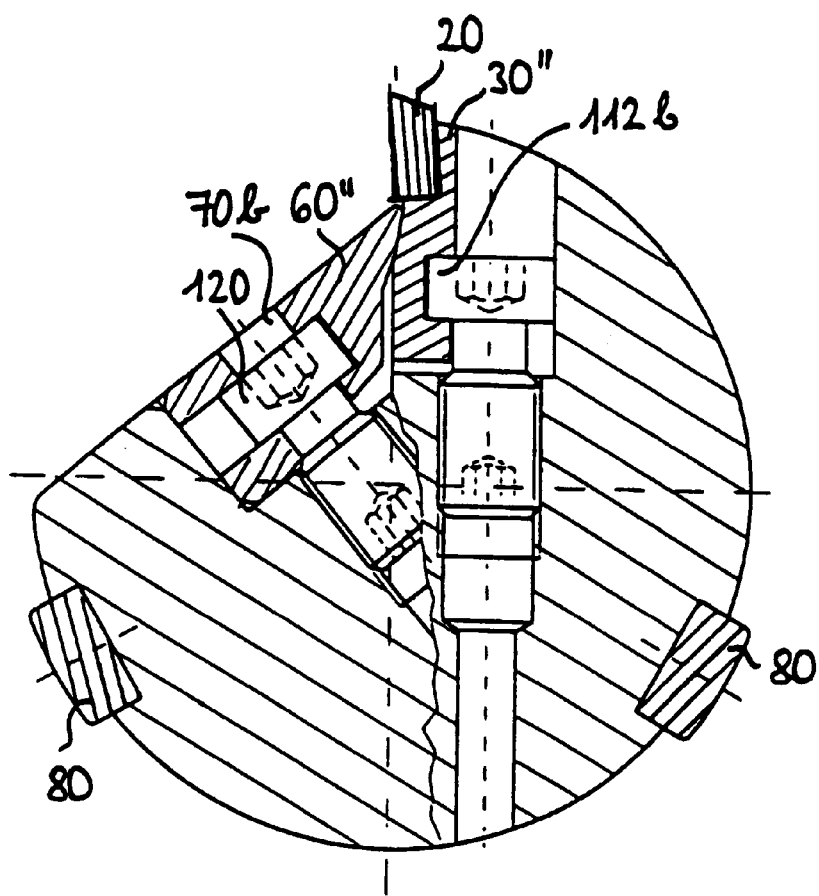
FIG. 18 is a partially broken away sectional view through an eighth embodiment of friction and cutting tool according to the invention, similar to FIG. 1.
Figure 19:
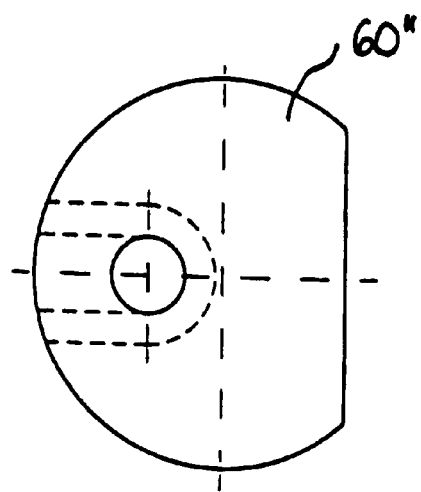
FIG. 19 is a plan view of the clamping wedge of FIG. 18.
Figure 18:
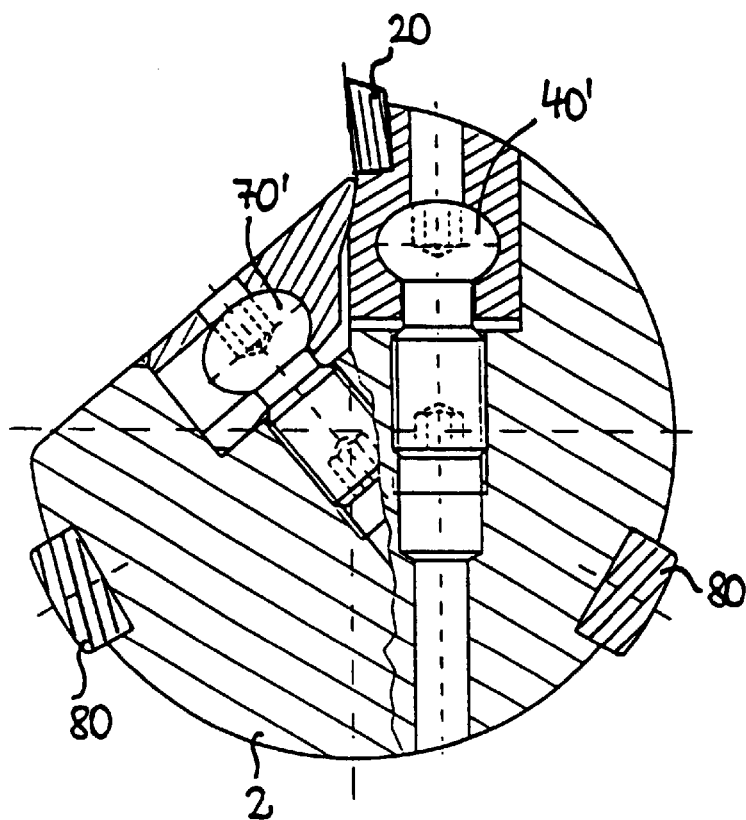
Figure 19:
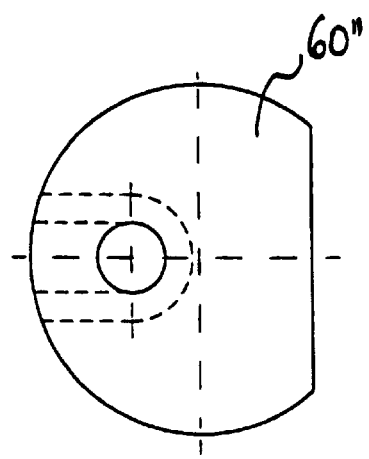
Figure 21:
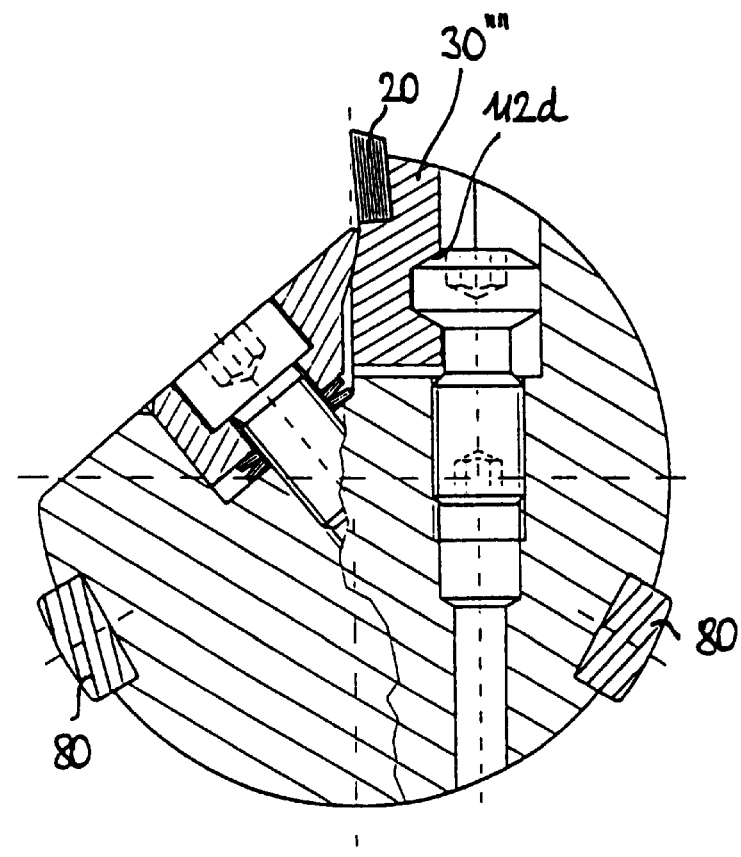
FIG. 21 is a partially broken away sectional view through a tenth embodiment of friction and cutting tool according to the invention, similar to FIG. 1.
Figure 21:
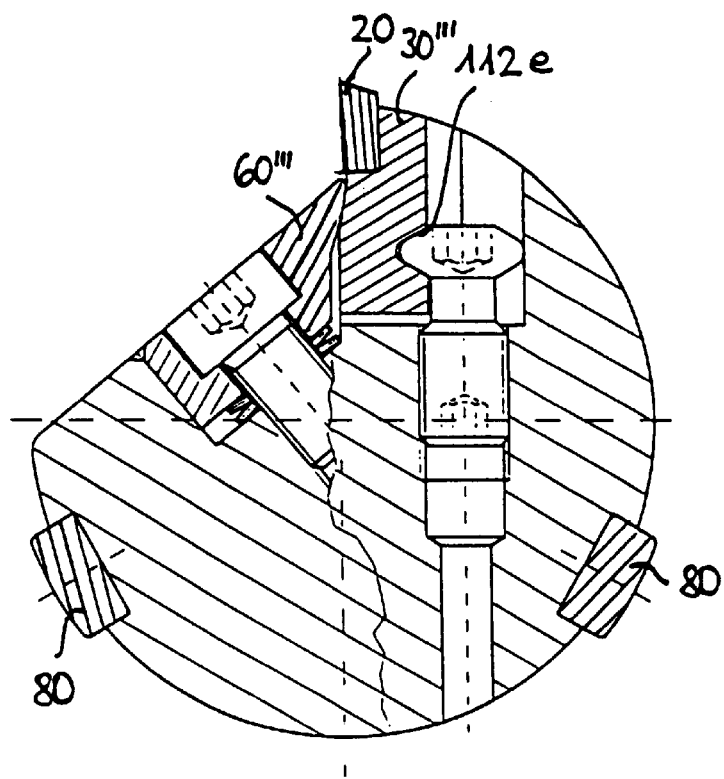
Figure 21:
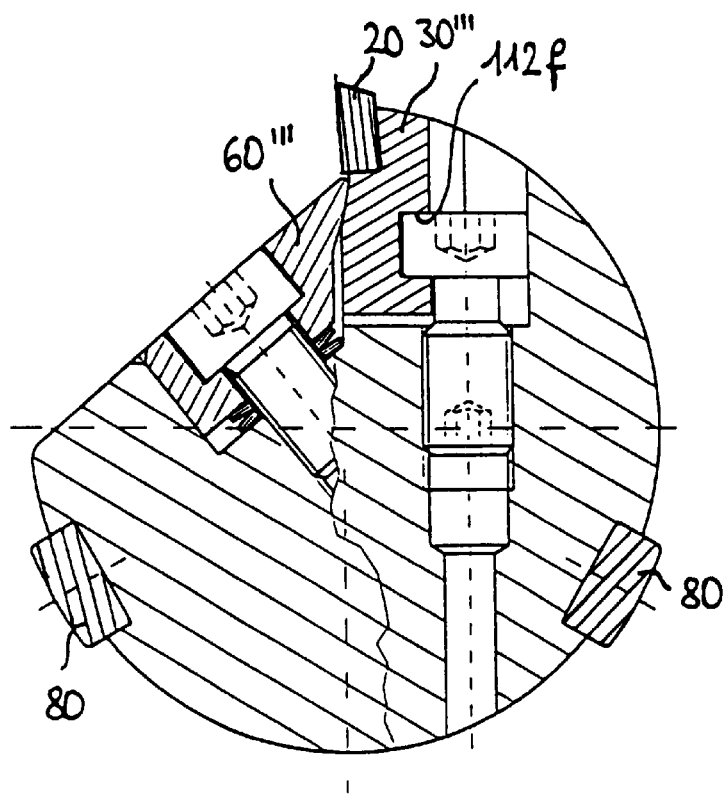

The tenth embodiment illustrated in FIG. 21 differs from those of FIGS. 9 and 18 in the cross-sectional shape of the groove 112d in the cassette 30"", which is here trapezoidal in shape. Variations of the tenth embodiment with further groove cross-section shapes (wedge-shaped, rectangular) are shown in FIG. 21a and FIG. 21b.

Figure 22:
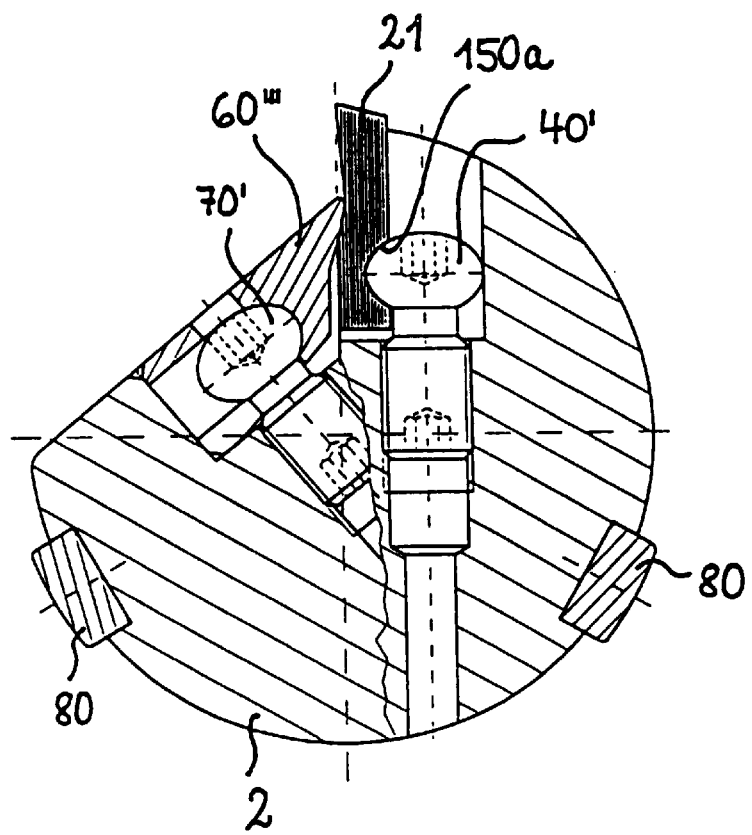
FIG. 22 is a partially broken away sectional view through an eleventh embodiment of friction and cutting tool according to the invention, similar to FIG. 1, in which the cutting blade itself is the adjusting member.
Figure 22:
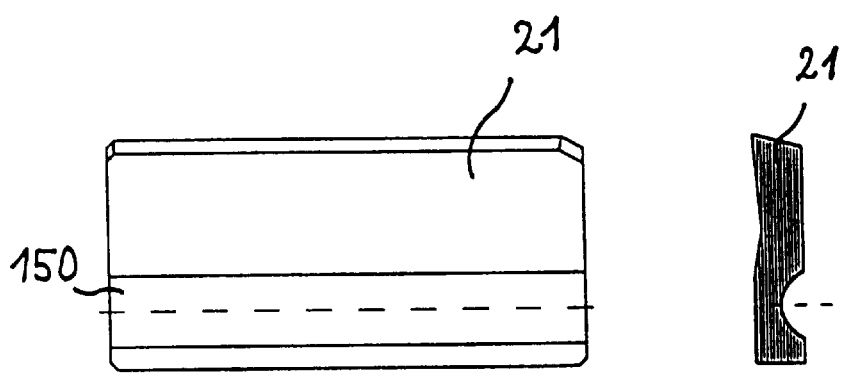
Figure 22:
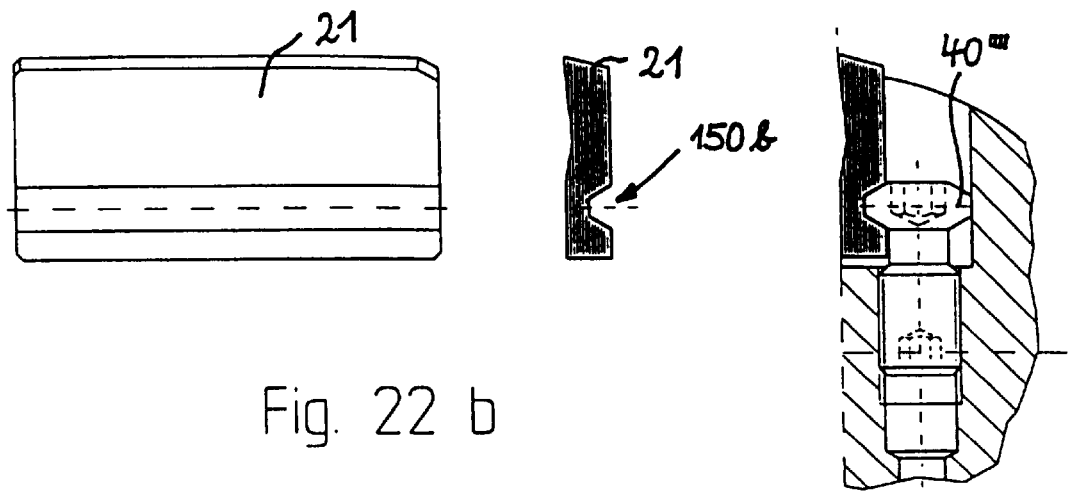
Figure 22:
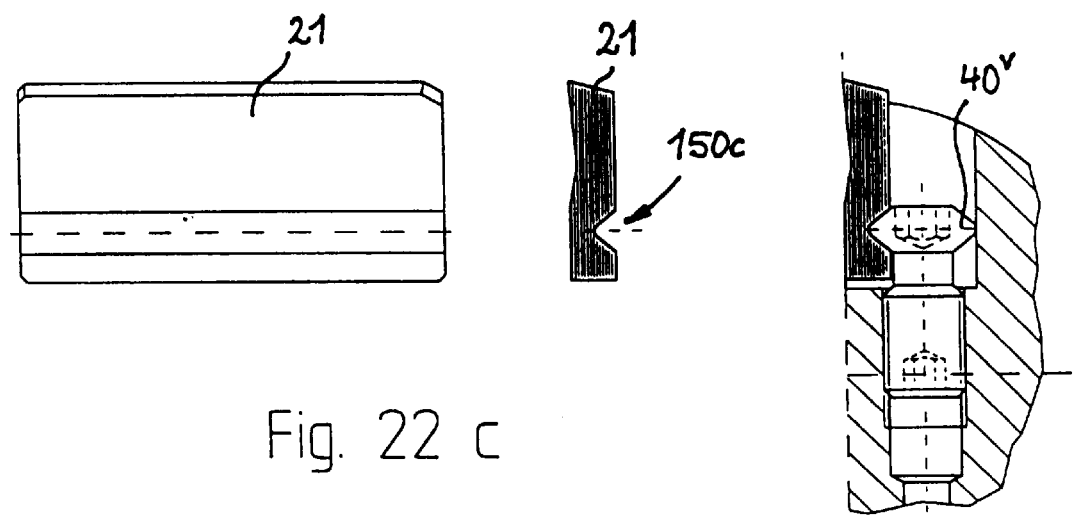
Figure 22:
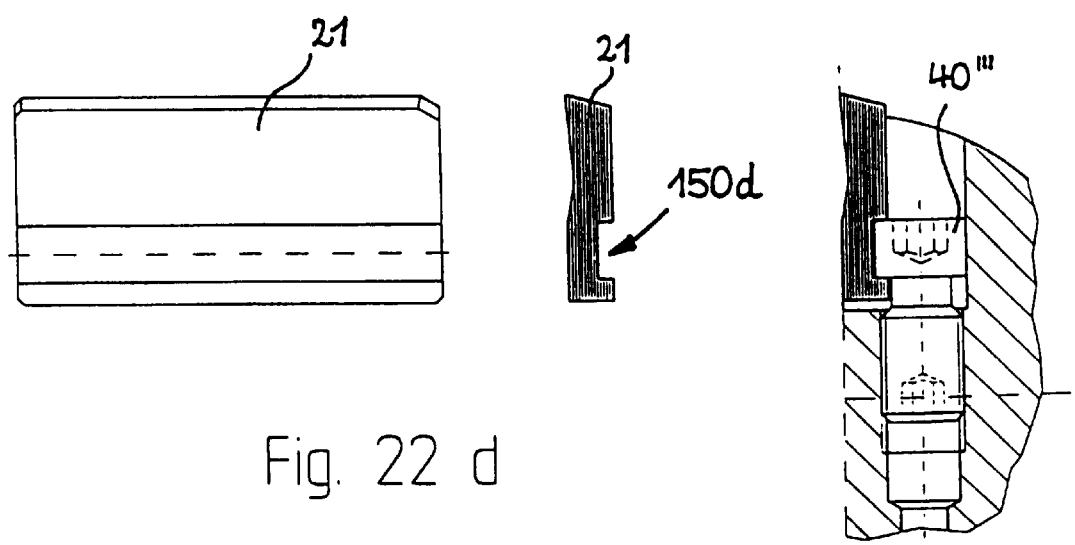

FIG. 22 shows an eleventh embodiment, which differs from the embodiments described above in terms of the design of the cutting blade. The cutting blade 21 is here not held in a cassette, but is seated on a carrier and is itself an adjusting means. For this purpose, in the cutting blade 21 there is eroded an ellipsoidal recess 150a in which the head of an adjusting member 40' (ball member) engages. The adjusting member with support screw is provided for the adjustment of the cutting blade 21. The clamping wedge 60''' is seated against the cutting blade 21 and is actuated by a ball member 70' in a direction parallel to the axis of the adjusting member 40'.

FIG. 22a shows a variation of the eleventh embodiment, with a shallow elliptical recess 150b. Further variations are shown in FIG. 22b to FIG. 22d. In these the cross-section of the recess is shown as trough-shaped, wedge-shaped and rectangular.

Figure 23:
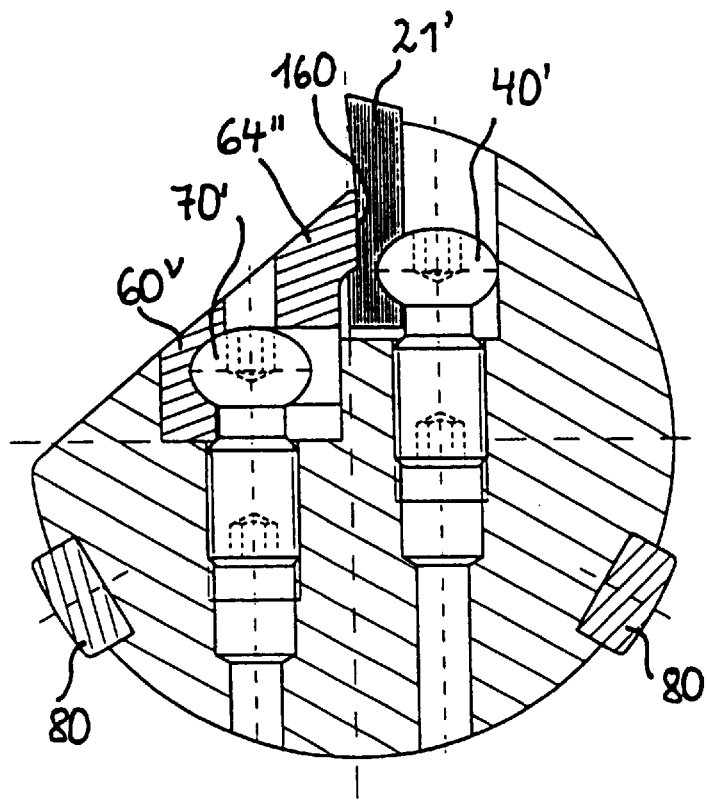
FIG. 23 is a partially broken away sectional view through a twelfth embodiment of friction and cutting tool according to the invention, similar to FIG. 1.
Figure 23:
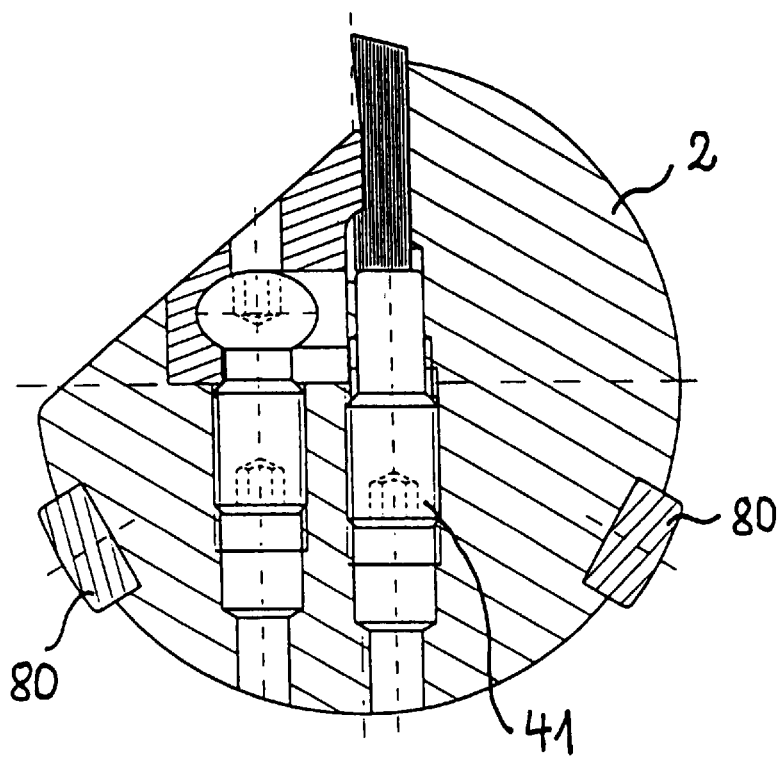
Figure 25:
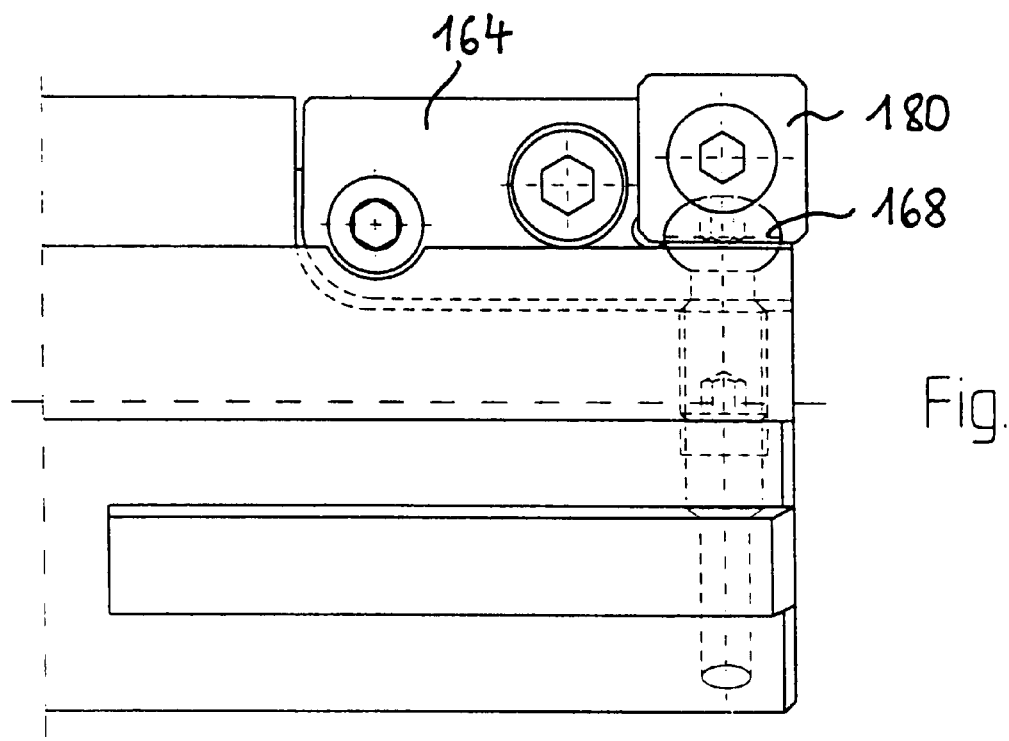
FIG. 25 is a side view of a fourteenth embodiment of friction and cutting tool according to the invention, with exchangeable cassette.
Figure 25:
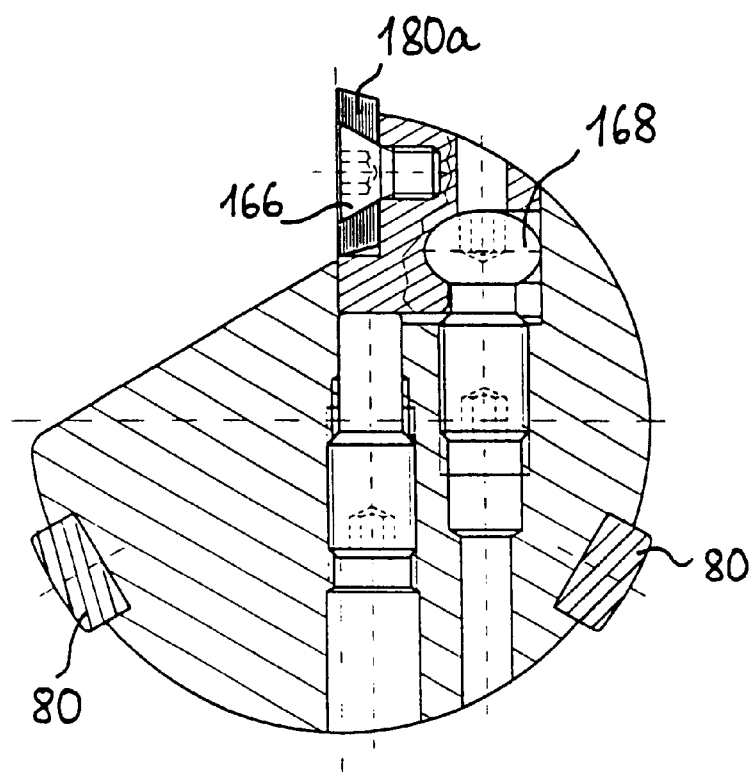
Figure 25:
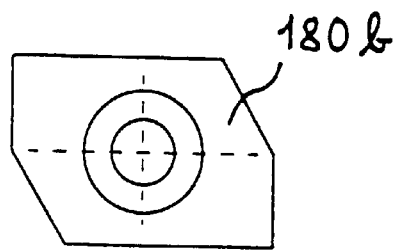
Figure 25:
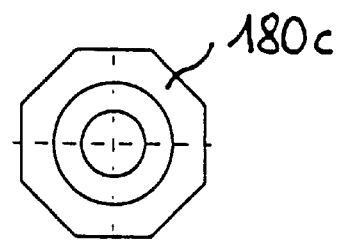
Figure 25:
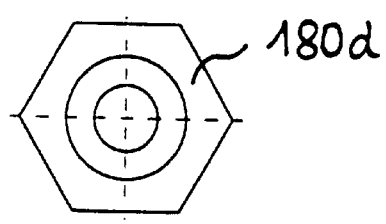
Figure 25:
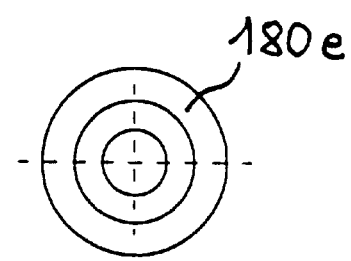

FIG. 23 illustrates a twelfth embodiment. In this embodiment the adjusting member 40' and the clamping part 70' act in parallel directions. The cutting blade 21' is again not in a cassette, but is only held on a carrier which is not shown. On the side facing the clamping wedge $60^V$ the blade is provided with a recess with a step in which the front end region 64" of the clamping wedge $60^V$ engages.

In a variation of the twelfth embodiment shown in FIG. 23a, a specially threaded pin 41 engages from below against the cutting blade 21" to effect its adjustment.

FIG. 24, FIG. 24a and FIG. 24b show a thirteenth embodiment, an example in which there is a clamping engagement between cassette and cutting blade. A cassette 30h shown here includes a trough-shaped recess 30i, to which a cutting blade 170 is complementarily shaped so that upon insertion of the cutting blade 170 into the cassette recess there is a fit by virtue of shape. In order to simplify the mounting of the cutting blade 170, a centering groove 30k is provided in the bottom of the groove 30i. The fixing of the cutting blade is effected by means of a clamping wedge 60'''. It will be apparent that other shapes, such as for example rectangular etc, are possible for the recess and for the cutting blade projection. FIG. 24c illustrates the arrangement with cassette 30h open.

In a fourteenth embodiment of the invention shown in FIG. 25 and FIGS. 25a to e, which is designed as a boring tool, a cutting plate carrier 164 is again provided. The cutting blade 180 can, according to FIGS. 25a to d, have different shapes (rectangular, offset rhomboid, hexagonal, circular cross-sections). The cutting blade 180 is again held in place by shape and is adjustable by means of a differential screw or a shaped component 168, here shown with an elliptical head.

Figure 26:
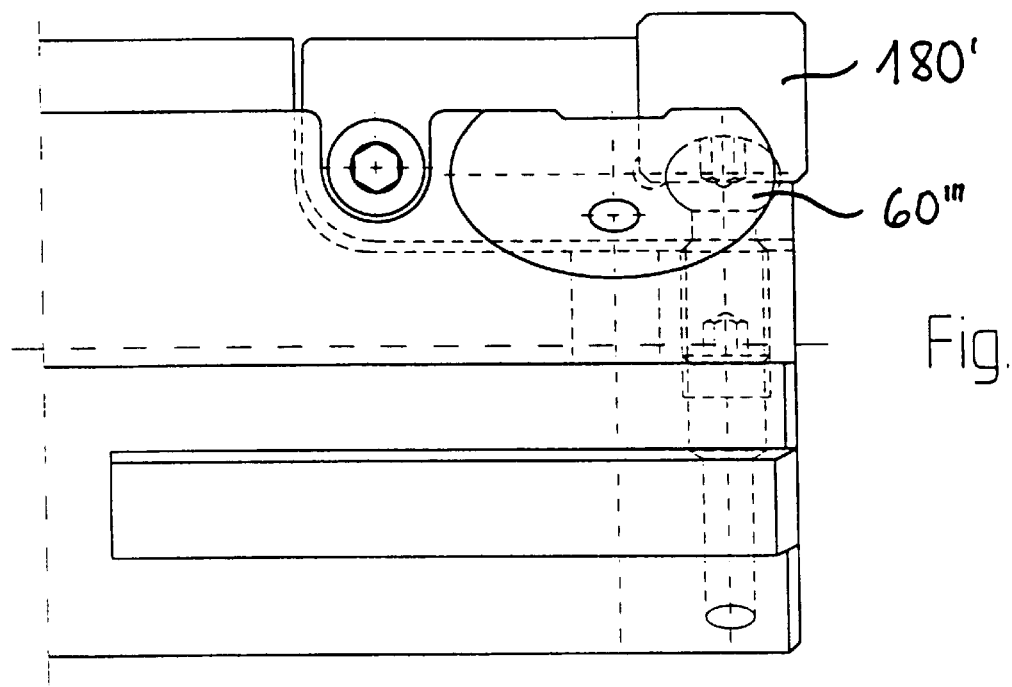
FIG. 26 is a side view of a fifteenth embodiment of friction and cutting tool according to the invention having an exchangeable cassette.
Figure 26:
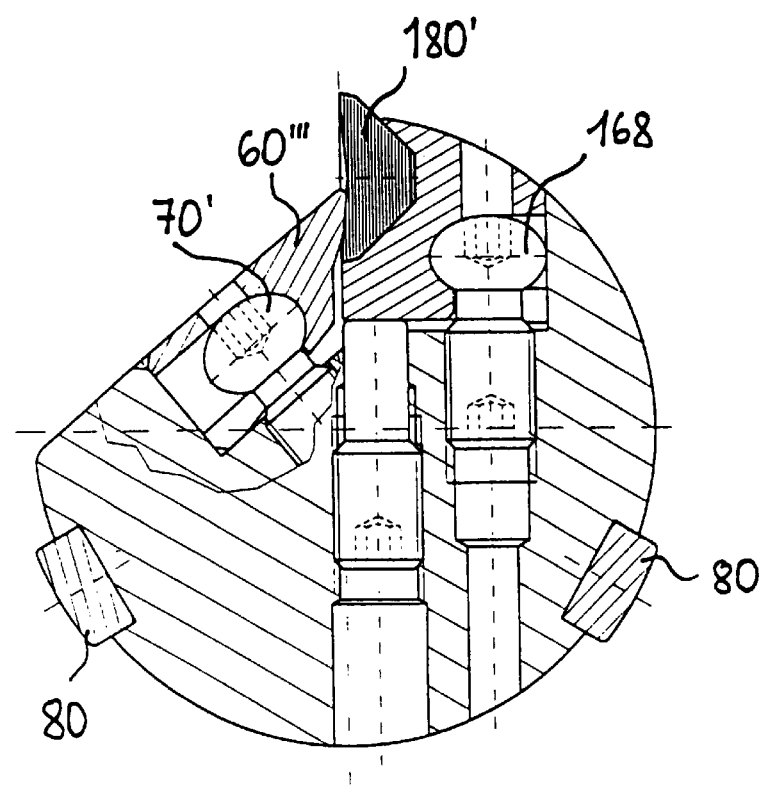
Figure 26:
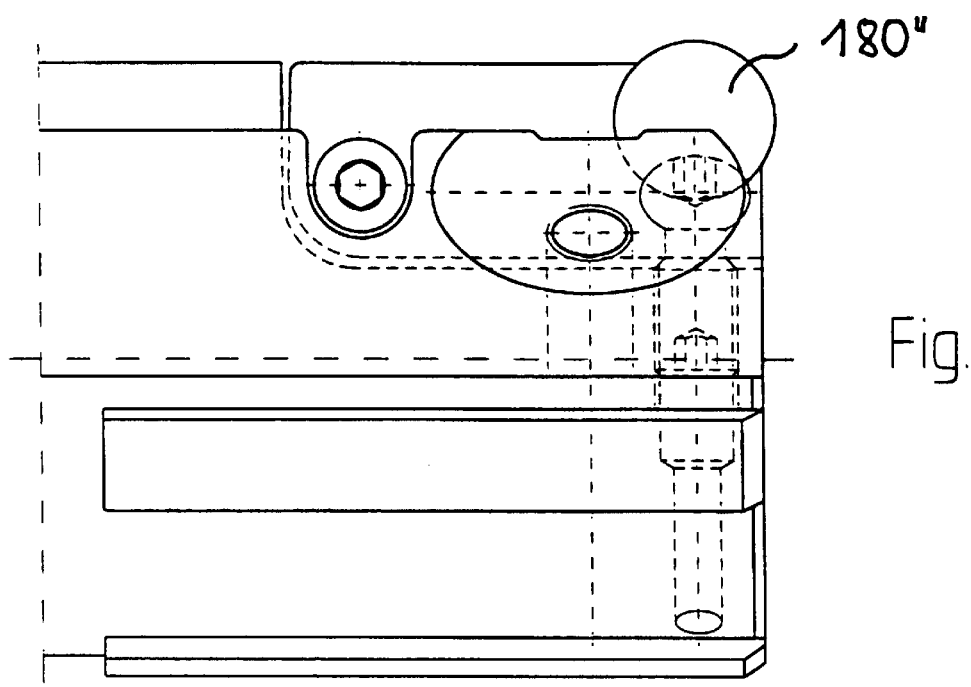
Figure 26:
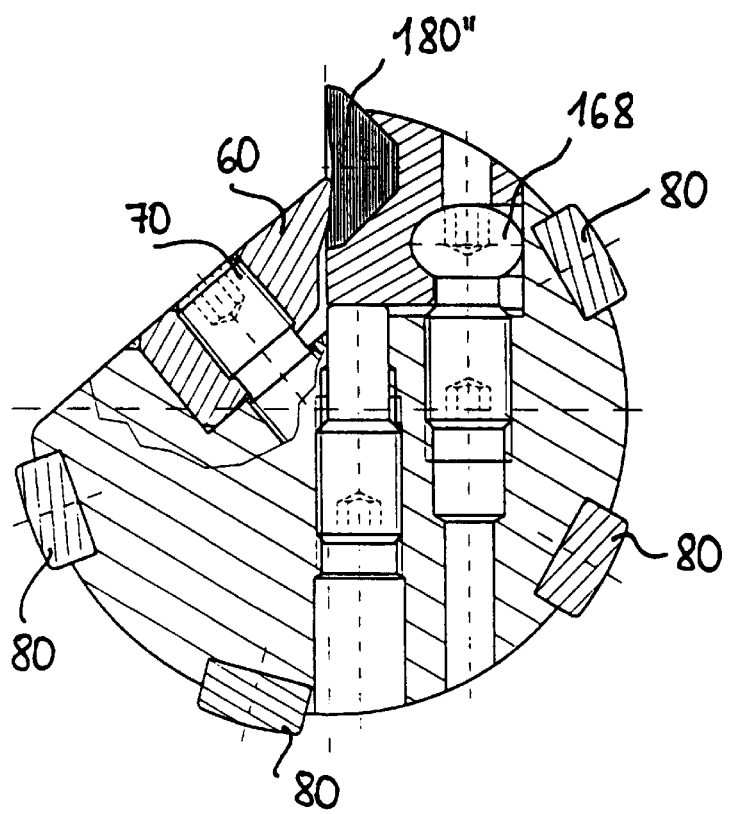

FIG. 26 and FIG. 26a show a fifteenth embodiment of the invention which likewise is designed as a boring tool for larger diameters. The cutting blade 180' has a larger thickness and is fixed in position by means of clamping wedge 60'''.

A variation of this embodiment illustrated in FIG. 26b and FIG. 26c differs from the main embodiment in terms of the shape of the cutting blade 180", which here has a circular cross-section. This variation is also an example of an embodiment for larger diameters and has four guide ribs 80.

Figure 27:
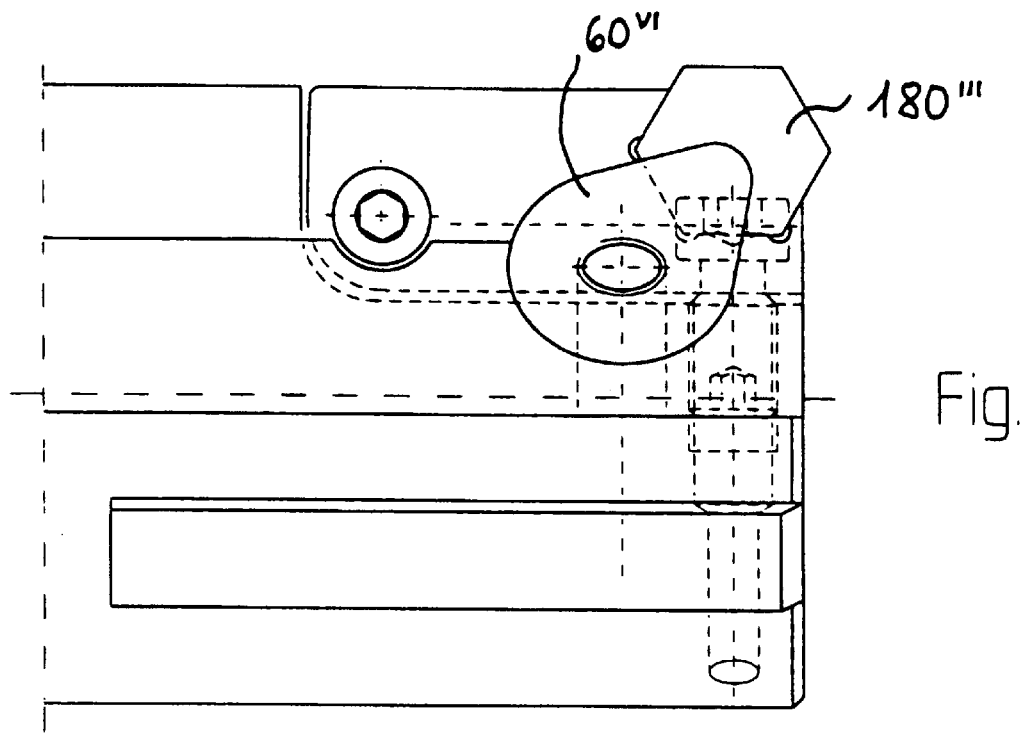
FIG. 27 is a side view of a sixteenth embodiment of friction and cutting tool according to the invention, having another shape of cutting blade and clamping wedge.
Figure 27:
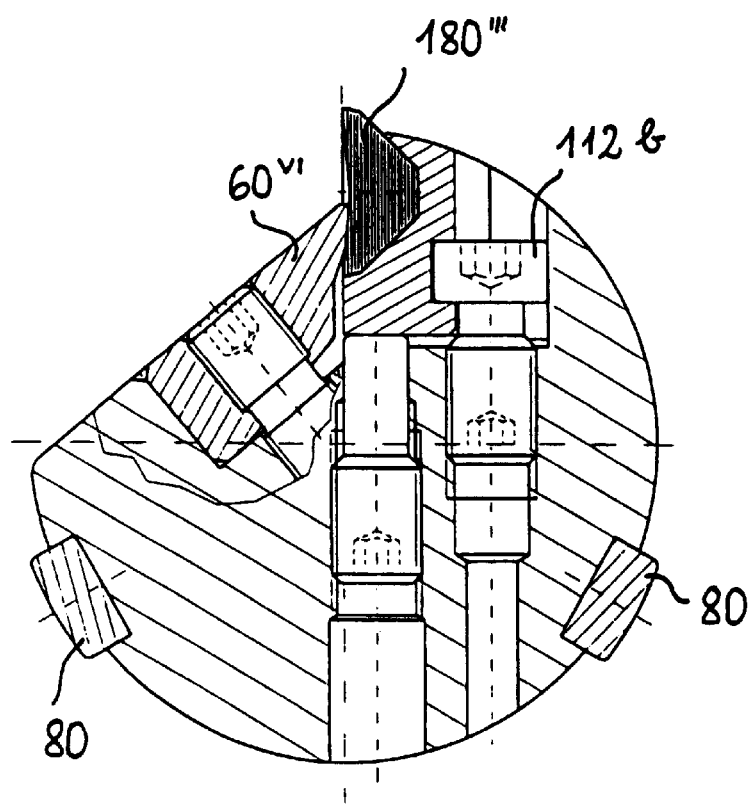

FIG. 27 and FIG. 27a show a sixteenth embodiment of a boring and cutting tool according to the invention, which comprises a cutting blade 180''' with a different cross-sectional shape, as well as a clamping wedge $60^{VI}$ of a different shape.

Figure 28A:
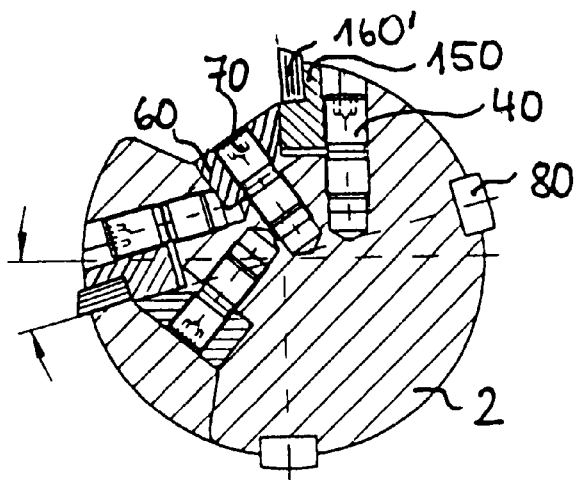
FIG. 28a is a cross-section through a seventeenth embodiment of friction and cutting tool according to the invention, having two cutters and two guide ribs disposed opposite the cutters.
Figure 28B:
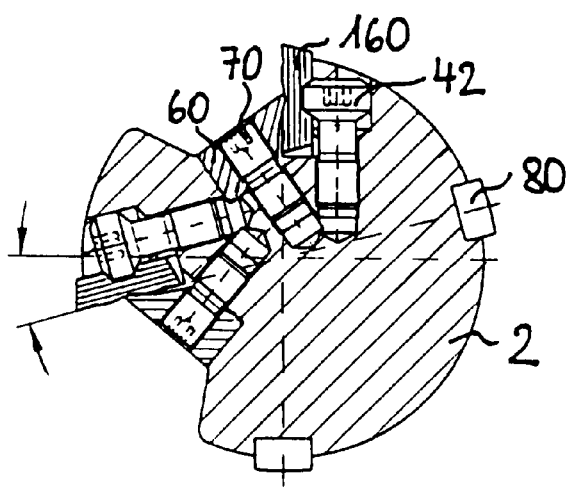
FIG. 28b is a cross-section through an eighteenth embodiment of friction and cutting tool according to the invention, having two cutter and two guide ribs disposed opposite the cutters.

FIG. 28a and FIG. 28b show a seventeenth embodiment of the invention having two cutters, in which each is provided with a cassette 150 of steel in whose recess a cutting blade 160' of hard metal is fixed by soldering and is adjustable by means of a differential screw 40. In contrast to the preceding embodiment where the guide ribs are at approximately 80° to 100° to the cutter, here respective guide ribs 80 are arranged opposite the cutters, as a result of which the tool is particularly suitable for fine machining. The cutter arrangement is not to be regarded as limited to the given angular range. The provision of two cutters makes possible a fine machining, wherein for example one cutter can project axially in relation to the other. The other cutter for the fine machining then preferably projects radially in relation to the other.

In FIG. 28b is shown an eighteenth embodiment of the invention which differs from the preceding one only in the design of the cutting blade arrangement, i.e. it has an adjustment by means of automatic shape engagement.

Figure 29:
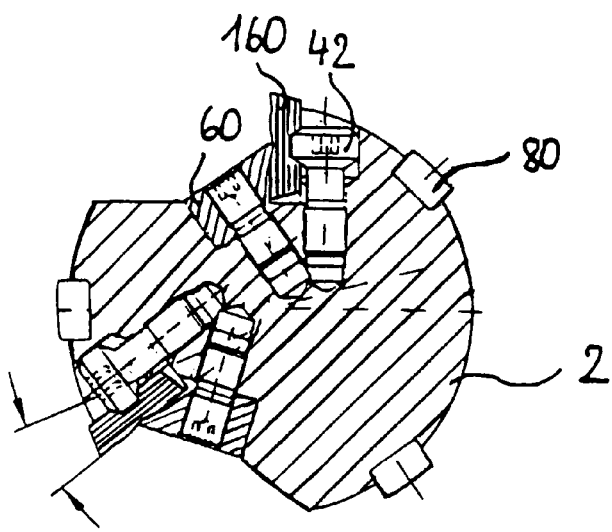
FIG. 29 is a cross-section through a nineteenth embodiment of friction and cutting tool according to the invention, having two cutters and three guide ribs.

A nineteenth embodiment of a friction and cutting tool according to the invention illustrated in FIG. 29 comprises in relation to the tool according to the eighteenth embodiment a third guide rib on the side which is opposite the two other guide ribs 80. By this means it is possible to achieve a particularly quiet running of the tool and consequently an extraordinarily high surface finish.

Figure 30A:
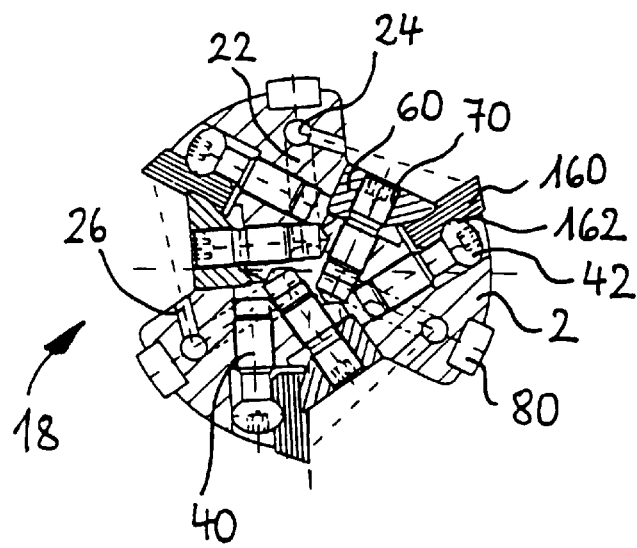
FIG. 30a is a cross-section through a twentieth embodiment of friction and cutting tool according to the invention, having three adjustable cutters and three guide ribs.
Figure 30B:
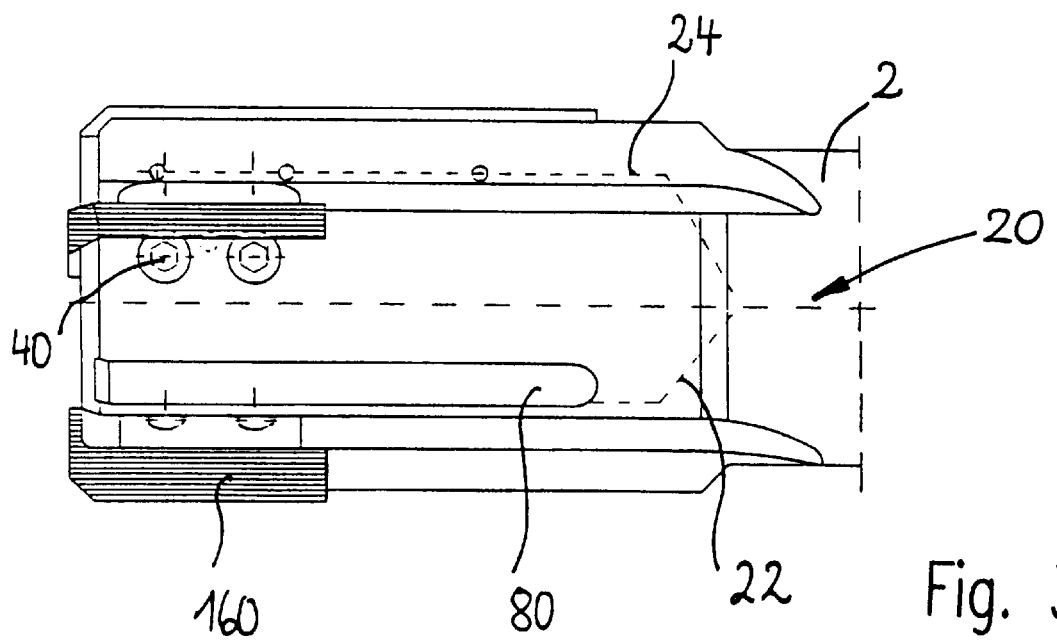
FIG. 30b is a longitudinal section through the friction and cutting tool of FIG. 30a, FIG. 31a is a cross-section through a twenty first embodiment of friction and cutting tool according to the invention, having three adjustable cutters and six guide ribs.
Figure 37:
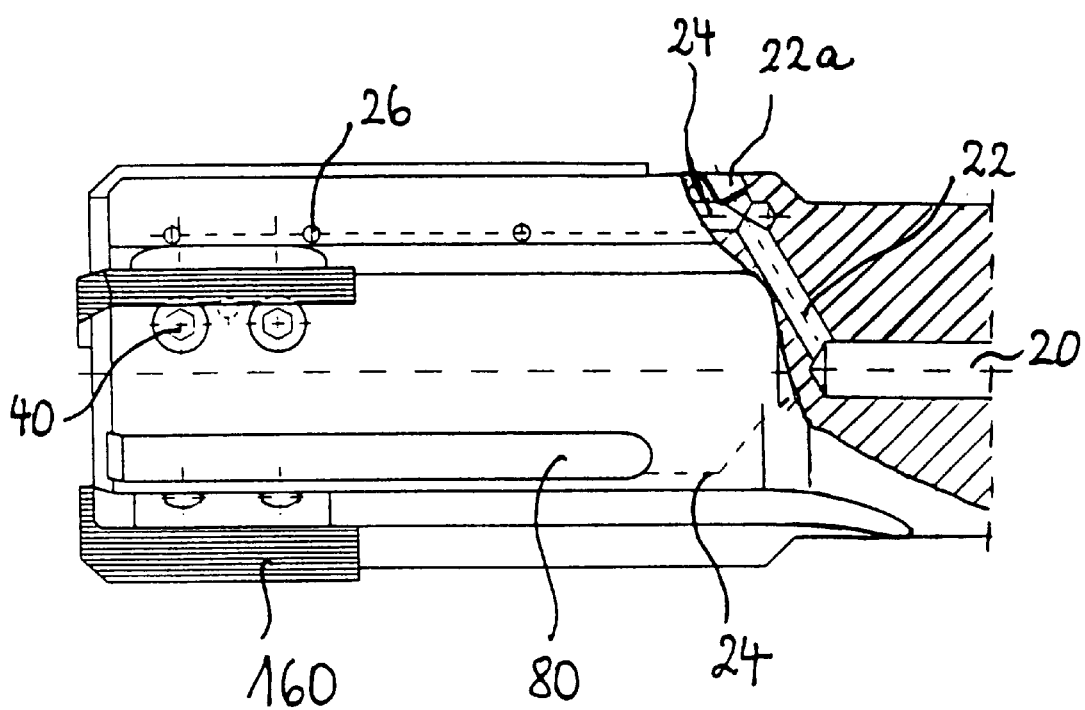

The twentieth embodiment of a friction and cutting tool according to the invention shown in FIG. 30a and FIG. 30b comprises three guide ribs 80 of cermet and three cutting blades 160 of hard metal which are seated on a carrier. In this embodiment, an axial coolant bore 20 is provided in the base member or shaft 2, this only being indicated generally in FIG. 30b and the arrangement of which is shown in FIG. 37. In the rearward part of the shaft 2 there extends an axial bore 20 for coolant and lubricant in the direction of the cutting head. The axial bore 20 divides into branch bores 22 which extend at an angle outwards and forwards. Towards the outside the branch bores 22 are closed by stops 22a. At a radial distance from the shaft axis, inwards from the guide ribs 80, the branch bores 22 extend into coaxial feed bores 24 which are closed at their end-face ends by stops which are not shown. Approximately from the middle region up to the forward region, in the illustrated embodiment, the coaxial feed bores 24 have three outlet bores 26 which respectively issue into the chip space 18.

By this structure for the supply of the coolant and lubricant the shaft 2 is itself cooled in the cutting region by the coaxial feed bores 24. The coaxial arrangement of the feed bores 24 makes it possible to position the outlet bores 26 according to the demands of the tool and to choose the number of bores according to need, so that the cutters can be cooled effectively by direct flushing, and indeed over a desired axial region. Additionally, the chip flushing and the cleaning of the chip space can be optimised in this way according to the workpiece material.

Figure 31A:
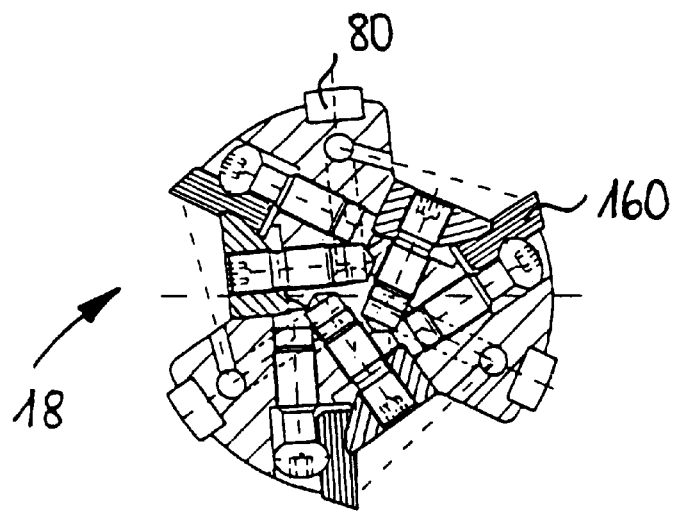
FIG. 31b is a longitudinal section through the friction and cutting tool of FIG. 31a, FIG. 32a is a cross-section through a twenty second embodiment of friction and cutting tool according to the invention, having three adjustable cutters and three guide ribs.
Figure 31B:
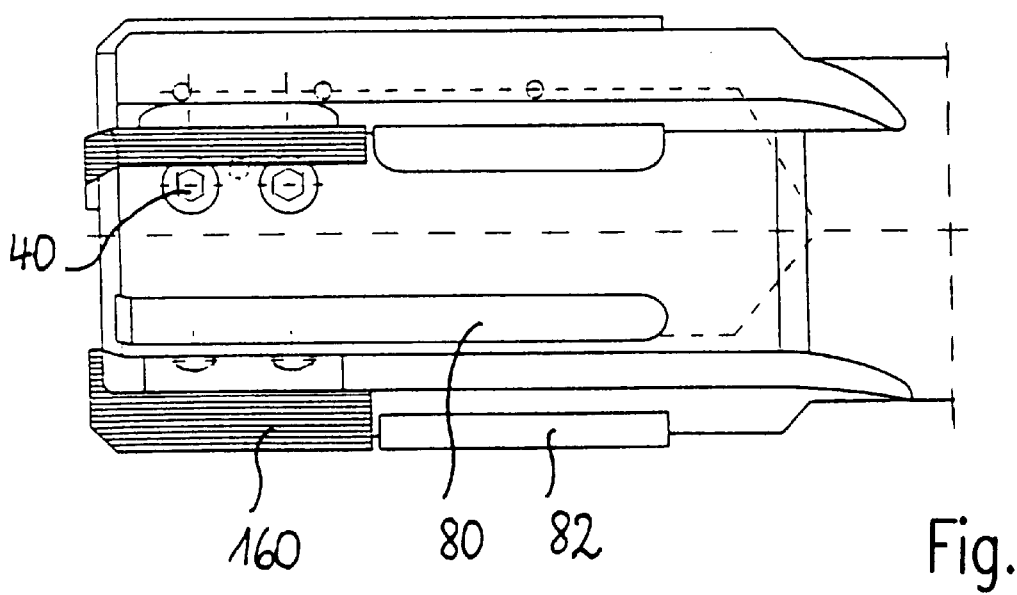

In FIG. 31a and FIG. 31b is illustrated a twenty first embodiment of the invention, which in addition to the features of the nineteenth embodiment has additional guide ribs 82 offset axially in relation to the cutters.

Figure 32A:
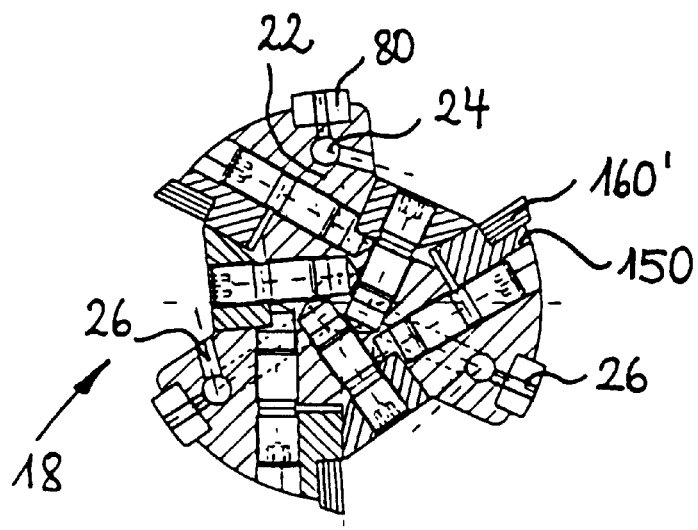
FIG. 32b is a longitudinal section through the friction and cutting tool of FIG. 32a, FIG. 33a is a cross-section through a twenty third embodiment of friction and cutting tool according to the invention, having three adjustable cutters and six guide ribs.
Figure 32B:
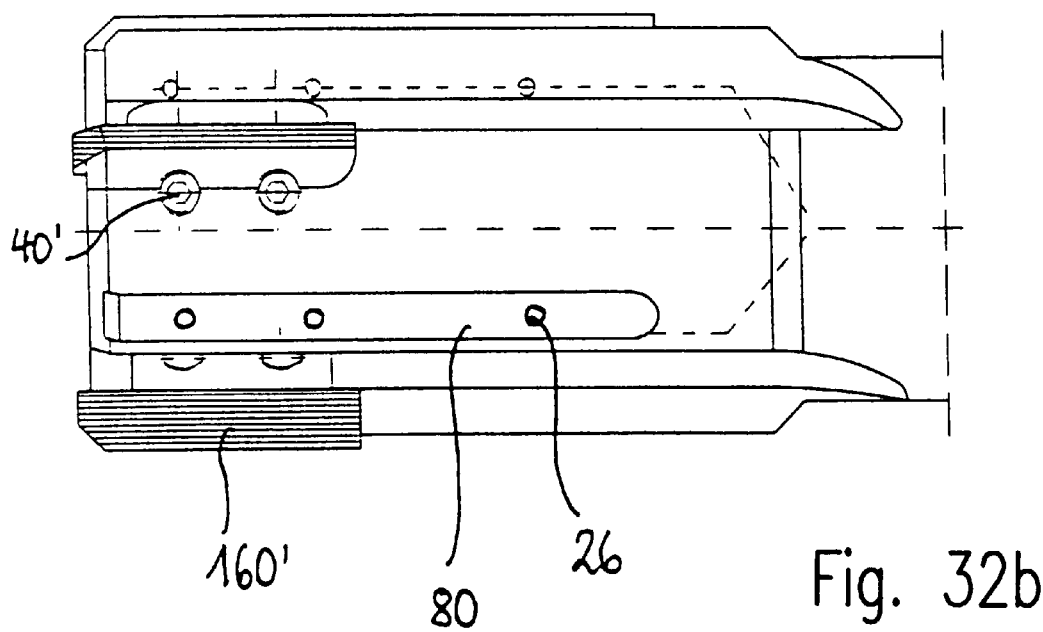

FIG. 32a and FIG. 32b show a twenty second embodiment of a friction and sinking cutting tool according to the invention. This differs from the nineteenth embodiment essentially in the design of the cutting blade arrangement. Instead of a cutting blade 160 which is in direct engagement with the adjusting means, here a steel cassette 150 is provided forming the cutting blade carrier, and in whose recess a cutting blade 160' of hard metal is fixed by soldering. A differential screw 40' is in engagement with two open threaded sections of the cassette 150 and by this means adjusts the cutting blade 160'. Additionally, in the guide ribs 80, internal feed bores 24 and outlet bores 26 are provided for improved cooling and lubrication.

Figure 33A:
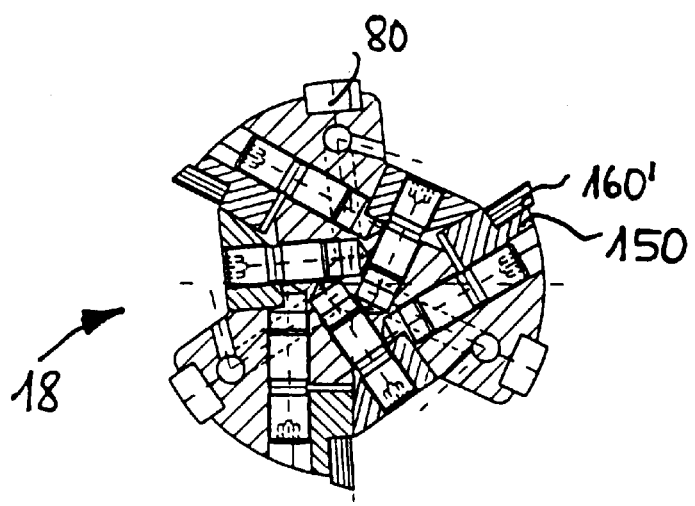
FIG. 33b is a longitudinal section through the friction and cutting tool of FIG. 33a, FIG. 34a is a cross-section through a twenty fourth embodiment of friction and cutting tool according to the invention, having two adjustable cutters and four guide ribs.
Figure 33B:
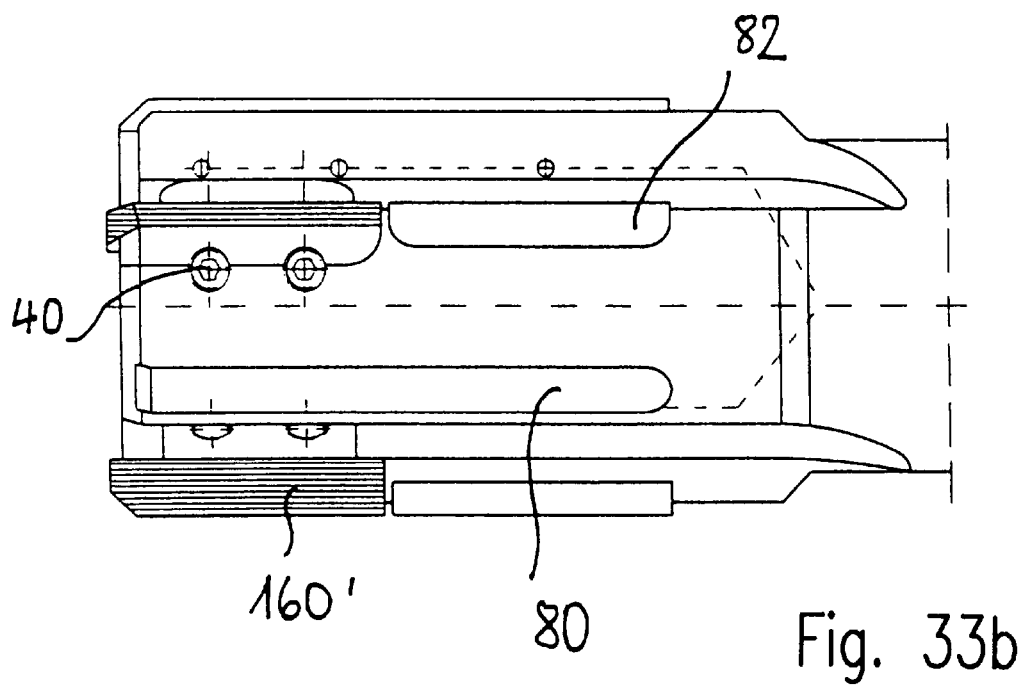

In FIG. 33a and FIG. 33b is shown a twenty third embodiment of the invention, which in addition to the features of the eighteenth embodiment has additional guide ribs 82 offset axially in relation to the cutters.

Figure 34A:
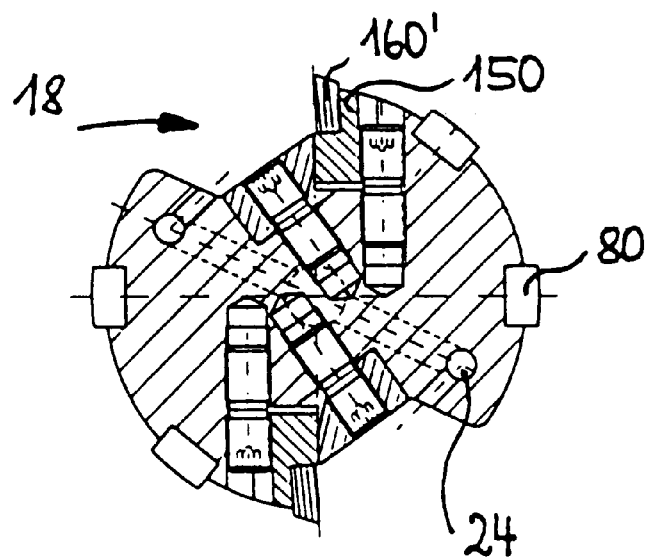
FIG. 34b is a longitudinal section through the friction and cutting tool of FIG. 34a, FIG. 35a is a cross-section through a twenty fifth embodiment of friction and cutting tool according to the invention, similar to the twenty first embodiment, which has two clearance channels in the external periphery of the base member.
Figure 34B:
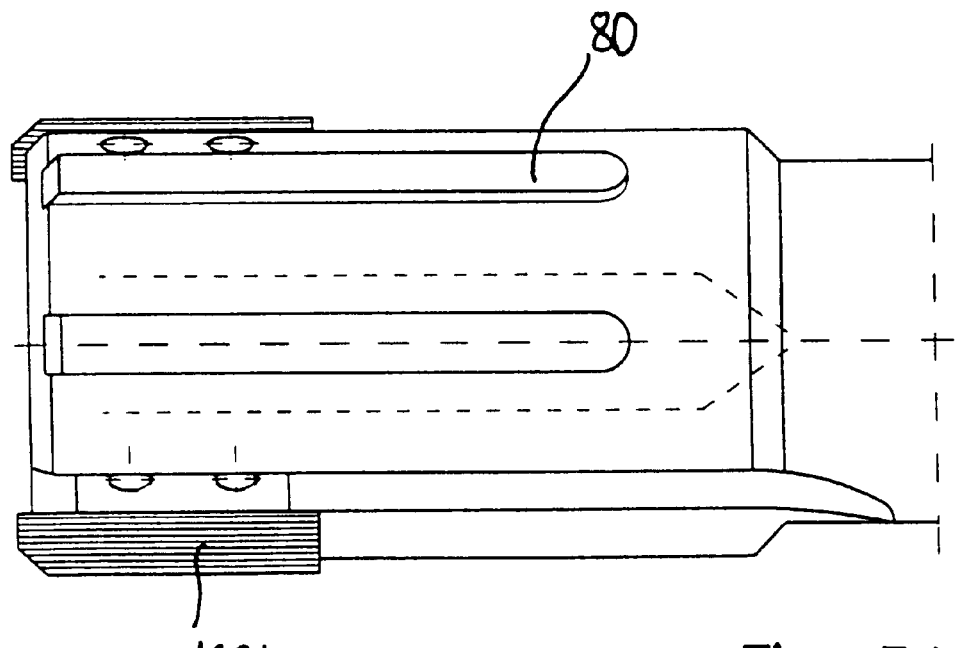

A friction and sinking cutting tool illustrated in FIG. 34a and FIG. 34b having two adjustable cutters is constructed in similar manner to the embodiment shown in FIG. 32. It comprises two cutting blades 160' fixed in cassettes 150 and, between these, two pairs of guide ribs 80. The clamp fixing by means of clamping wedge 60 is the same. Two coaxial feed lines 24 for coolant are provided, which are arranged diametrically opposite one another. Their outlet apertures issue into the chip space 18.

Figure 35A:
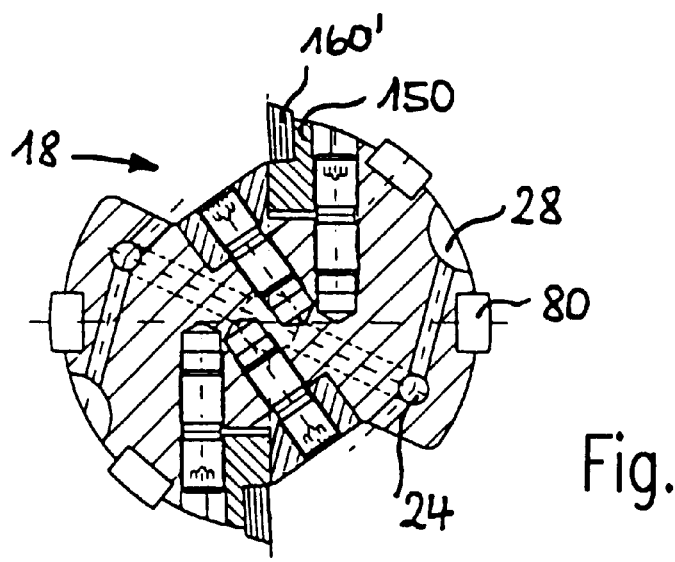
FIG. 35b is a longitudinal section through the friction and cutting tool of FIG. 35a, FIG. 36a is a cross-section through a twenty sixth embodiment of friction and cutting tool according to the invention, having two adjustable cutters and six guide ribs.
Figure 35B:
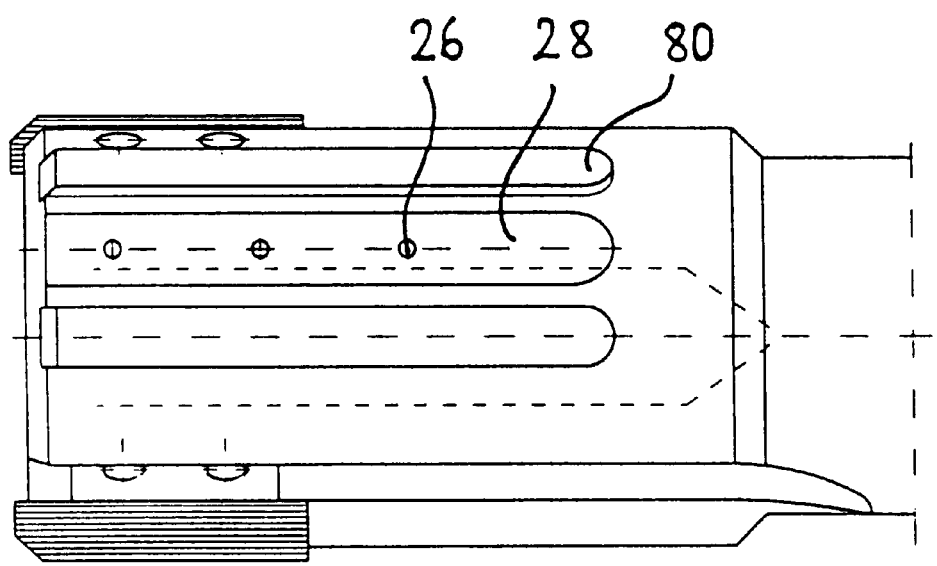

In the twenty fifth embodiment shown in FIG. 35a and FIG. 35b, in addition to the features of the twenty first embodiment described above, clearance channels 28 are provided in the base member or shaft 2, into which three outlet bores 26 for coolant issue.

Figure 36A:
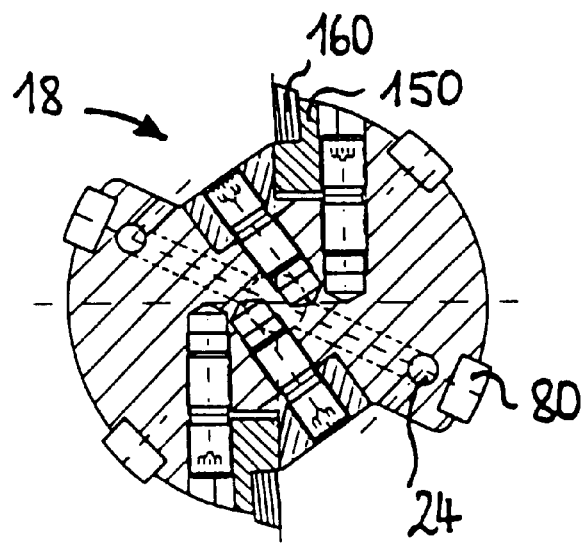
FIG. 36b is a longitudinal section through the friction and cutting tool of FIG. 36a, and FIG. 37 is a partially broken away longitudinal section through a tool shaft of a friction and cutting tool which illustrates the arrangement of the bores for cooling means.
Figure 36B:
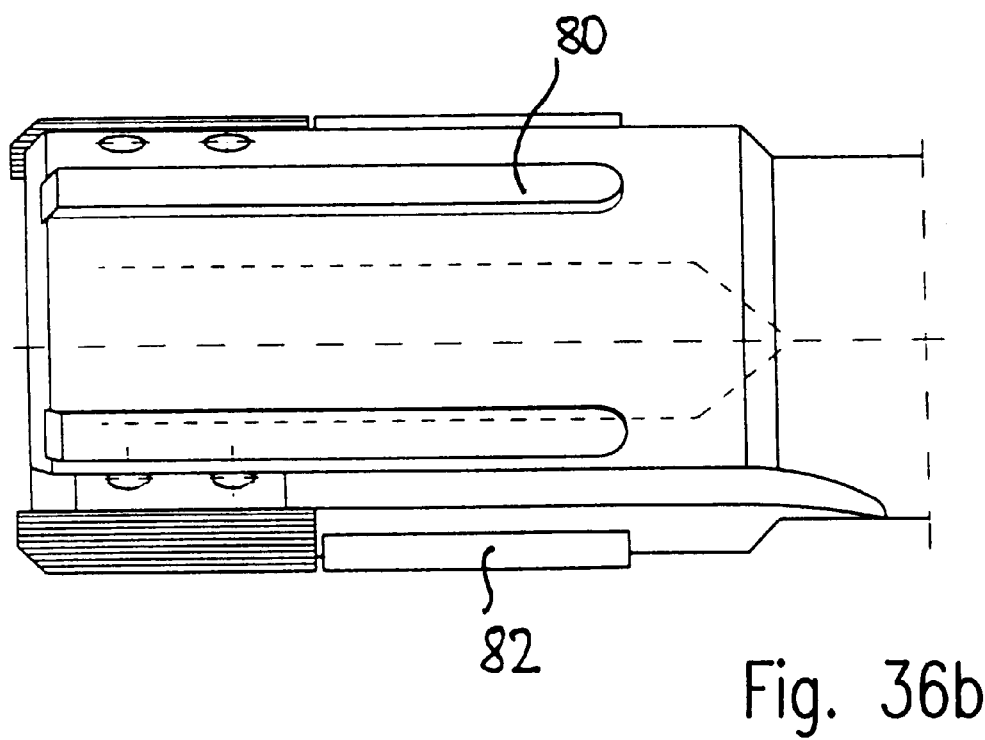

The twenty sixth embodiment shown in FIG. 36a and FIG. 36b differs from the preceding embodiment in that it is additionally provided with guide ribs 82 which are arranged in alignment with the cutting blades 160'.

What is claimed is:

1. Friction and sinking cutting tool comprising a base member (2) to which a cutting blade (20) is exchangeably clampingly secured by means of a clamping member (70) and the blade being adjustable in its radial position by an adjusting member (40) through the intermediary of an adjusting means (30), wherein the adjusting means (30) is a cutting blade carrier extending into a recess in the base member and wherein the adjusting member (40) comprises two differential screws which are in threaded engagement with the adjusting means (30).

2. Friction and sinking cutting tool comprising a base member to which a cutting blade (20) is exchangeably clampingly secured by means of a clamping member (70) and the blade being adjustable in its radial position by an adjusting member (40) through the intermediary of an adjusting means, wherein the adjusting means (30) is a cutting blade carrier extending into a recess in the base member (2) and wherein the adjusting member (40, 168) comprises two ball members or clamping members which are in automatic shape engagement with a complementary recess in the adjusting means, such that a movement of the adjusting member causes a movement of the cutting blade in the same direction, with the cutting blade carrier being adjustable inwards and outwards.

3. Tool according to claim 1, characterised in that for the clamping securement of the cutting blade carrier (30) there is provided a clamping wedge (60) or clamping angle piece or a claw (160) which is held fast on the cutting blade side of the cutting blade carrier (30) by the clamping member (70).

4. Tool according to claim 1, characterised in that the differential clamping member is a clamping screw.

5. Tool according to claim 1, characterised in that the adjusting member is provided with a half thread.

6. Tool according to claim 1 characterized in that the adjusting member has a first thread having a first thread pitch and a second thread having a second thread pitch different from said first thread pitch.

7. Tool according to claim 1, characterised in that the cutting blade carrier (30) is a cassette extending in the longitudinal direction of the cutting blade (20) and of block form with a recess for the cutting blade (20).

8. Tool according to claim 7, characterised in that the cassette (30) is open with threaded sections (34)/complementary recess for engagement with the adjusting member (46) on its side remote from the cutting blade.

9. Tool according to claim 7, characterised in that the cassette is closed with threads/complementary recess provided in the cassette body for engagement with the adjusting member.

10. Tool according to claim 7, characterised in that the cassette (30) is provided with bores (90a, 92, 110) for support screws.

11. Tool according to claim 3, characterised in that the base member (2) has a bore (100a) for a support screw for securing the clamping wedge (60).

12. Tool according to claim 7, characterised in that in the cassette (30") or in the clamping wedge (60") there is provided a groove (120, 112b) as a complementary recess for adjusting member or clamping member.

13. Tool according to claim 7, characterised in that a compensation spring (130) is provided for the cassette (30''') acting in the radial direction.

14. Tool according to claim 3, characterised in that the clamping wedge (60''') is biased radially outwardly by a spring (140).

15. Tool according to claim 7, characterised in that a securing pin fixed in the base member and extending in the radial direction is in engagement with the end of the cassette which is the rearward end in relation to the tip of the tool.

16. Tool according to claim 7, characterised in that there is provided in the base member a recess for engagement with the end of the cassette which is to the rear in relation to the tip of the tool, said recess having a shape which corresponds in its contour to the shape of the end of the cassette.

17. Tool according to claim 1, characterised in that the cutting blade carrier is a plate.

18. Tool according to claim 3, characterised in that a recess (30i) is provided for a shape-fit positioning of the cutting blade (20h) and a clamping fixing by means of clamping wedge (60"").

19. Tool according to claim 1, characterised in that the cutting blade is soldered to the cutting blade carrier.

20. Tool for use as a fine boring tool according to claim 1, characterised in that the cutting blade is mounted in a shape-fitting manner in the cutting blade carrier.

21. Tool according to claim 1, characterised in that at least one guide rib (80) is provided.

22. Tool according to claim 1, characterised in that two guide ribs (80) are provided and are arranged at a peripheral spacing of 120° to one another and to the cutting blade.

23. Tool according to claim 1, characterised in that two guide ribs (80) are provided, one of which is arranged opposite the cutting blade (20).

24. Tool according to claim 1, characterised in that at least one further cutting blade is arranged in stepwise relation to the first cutting blade and axially spaced therefrom.

25. Tool according to claim 1, characterised in that at least two cutting blades are arranged around the periphery.

26. Tool according to claim 25, characterised in that two cutting blades (I, II) are arranged diametrically opposite each other.

27. Tool according to claim 1, characterised in that the cutting blade is of hard metal, cermet, ceramic, polycrystalline, natural or synthetic diamond as thin-film and thick-film.

28. Tool according to claim 1, characterised in that the cutting plate is of steel or hard metal.

29. Tool according to claim 1, characterised in that the guide ribs are of hard metal, cermet, ceramic, or polycrystalline, natural or synthetic diamond.

30. Tool according to claim 1, characterised in that means to supply coolant for the cutting blade or blades is provided.

31. Tool according to claim 30, characterised in that a central axial coolant bore (20) is provided in the tool shaft and at least one bore (22, 24, 26) leading to the cutting zone is provided for coolant or lubricant, and at least one branch bore (22) extends outwardly from the axial coolant bore (20) into the forward zone.

32. Tool according to claim 31, characterised in that the branch bore (22) issues into a coaxial feed bore (24) which extends axially at least partially over the cutting zone, and at least one outlet bore (26) leads to the cutting zone from the coaxial feed bore (24).

33. Tool according to claim 1, characterised in that at least one outlet bore (26) is associated with the guide rib (80).

34. Tool according to claim 33, characterised in that the outlet bore (26) associated with the guide rib (80) leads outwardly in advance of the guide rib in the direction of rotation.

35. Tool according to claim 33, characterised in that at least one outlet bore (26) extends outwardly through the guide rib (80).

36. Tool according to claim 30, characterised in that the coaxial feed bore (24) extends over the whole length of the cutting zone.

37. Tool according to claim 30, characterised in that a plurality of axially offset outlet bores (26) are provided.

38. Tool according to claim 30, characterised in that there is provided in the external periphery of the base member (2) at least one clearance channel (28) into which at least one outlet bore (26) issues.

39. Tool according to claim 30, characterised in that the outlet bore (26) issues into the chip space of an associated cutter (160).

40. Tool according to claim 30, characterised in that the branch bore (24) is directed at an angle forwards.

41. Tool having at least one guide rib (80), according to claim 30, characterised in that the branch bore outlet bore (22, 26) associated with the guide rib (80) has a smaller diameter than the bore associated with the cutter (160).

42. Use of the tool according to claim 1, as a reamer.

* * * * *

UNITED STATES PATENT AND TRADEMARK OFFICE
CERTIFICATE OF CORRECTION

PATENT NO. : 6,254,319 B1  
DATED : July 3, 2001  
INVENTOR(S) : Andreas Maier et al.

It is certified that error appears in the above-identified patent and that said Letters Patent is hereby corrected as shown below:

<u>Title page,</u>  
Foreign Application Priority Data, replace "May 20, 1998" with -- May 12, 1997 --.

Signed and Sealed this

Twenty-fifth Day of December, 2001

Attest:

JAMES E. ROGAN  
Director of the United States Patent and Trademark Office

Attesting Officer